US011289032B2

(12) United States Patent
Ozaki

(10) Patent No.: US 11,289,032 B2
(45) Date of Patent: Mar. 29, 2022

(54) DISPLAY DEVICE

(71) Applicant: Japan Display Inc., Minato-ku (JP)

(72) Inventor: Tadafumi Ozaki, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/922,211

(22) Filed: Jul. 7, 2020

(65) Prior Publication Data

US 2021/0012725 A1 Jan. 14, 2021

(30) Foreign Application Priority Data

Jul. 10, 2019 (JP) ............................ JP2019-128617

(51) Int. Cl.
*G09G 5/10* (2006.01)
*G06F 3/038* (2013.01)
*G09G 5/00* (2006.01)
*G09G 3/34* (2006.01)
*G09G 3/36* (2006.01)

(52) U.S. Cl.
CPC ......... *G09G 3/3413* (2013.01); *G09G 3/3607* (2013.01); *G09G 2320/0242* (2013.01); *G09G 2320/064* (2013.01); *G09G 2320/0646* (2013.01)

(58) Field of Classification Search
CPC .................................................... G09G 3/3233
See application file for complete search history.

(56) References Cited

U.S. PATENT DOCUMENTS

2005/0035981 A1* 2/2005 Ozaki ...................... G09G 3/20 345/690
2008/0068359 A1* 3/2008 Yoshida ............... G09G 3/3406 345/204

FOREIGN PATENT DOCUMENTS

JP 2010-97420 A 4/2010

* cited by examiner

*Primary Examiner* — Nan-Ying Yang
(74) *Attorney, Agent, or Firm* — Oblon, McClelland, Maier & Neustadt, L.L.P.

(57) ABSTRACT

A display device includes: a display panel including pixel rows to which line images are written; and a red, a green, and a blue light source. A display period of a frame image includes six subframe periods, each including a writing period and a lighting period. The line image of a color component corresponding to a combination of light emitted during the lighting period of a preceding period of two consecutive subframe periods, and light emitted during the lighting period of a subsequent period is written during the writing period of the preceding period. The subframe periods includes a first and a second subframe period provided alternately and consecutively, the first subframe period includes the writing period during which the line image is written to a first pixel row, and the second subframe period includes the writing period during which the line image is written to a second pixel row.

11 Claims, 14 Drawing Sheets

DISPLAY DEVICE

CROSS-REFERENCE TO RELATED APPLICATIONS

This application claims priority from Japanese Application No. 2019-128617, filed on Jul. 10, 2019, the contents of which are incorporated by reference herein in its entirety.

BACKGROUND

1. Technical Field

The present invention relates to a display device.

2. Description of the Related Art

A liquid crystal display device has been known in which pixels are controlled so that rays of light in a plurality of colors from the same pixel are transmitted at different timings (for example, Japanese Patent Application Laid-open Publication No. 2010-097420 (JP-A-2010-097420)).

In such a liquid crystal display device that is disclosed in JP-A-2010-097420, a phenomenon called color breakup, which is an unintentional change in color, may be visually recognized when the frame rate is low relative to human visibility. In general, it is possible to reduce the color breakup by increasing the frame rate. However, in the configuration disclosed in JP-A-2010-097420, the light emission time of the light source of each color is calculated by dividing one frame period by the number of colors of light. Consequently, the writing cycle of a signal for the pixel becomes a product of the frame rate and the number of colors. Thus, it has been difficult to simply increase the writing cycle, and it has been difficult to reduce the color breakup.

For the foregoing reasons, there is a need for a display device that can reduce color breakup.

SUMMARY

According to an aspect, a display device includes: a display panel including a plurality of pixel rows to which a plurality of line images are written, and configured to display a frame image by arranging the line images in a scanning direction; and a light source configured to emit light to the display panel. The light source includes a first light source configured to emit red light, a second light source configured to emit green light, and a third light source configured to emit blue light. A display period of the frame image includes six subframe periods. Each of the subframe periods includes a writing period of a corresponding one of the line images, and a lighting period during which the first light source, the second light source, or the third light source is turned ON. The line image of a color component corresponding to a combination of light emitted during the lighting period of a preceding subframe period of two consecutive subframe periods, and light emitted during the lighting period of a subsequent subframe period of the two consecutive subframe periods, is written during the writing period of the preceding subframe period. The six subframe periods includes a first subframe period and a second subframe period that are provided alternately and consecutively, the first subframe period includes the writing period during which the line image is written to a first pixel row included in the pixel rows, and the second subframe period includes the writing period during which the line image is written to a second pixel row included in the pixel rows and adjacent to the first pixel row.

DETAILED DESCRIPTION

Figure 1:
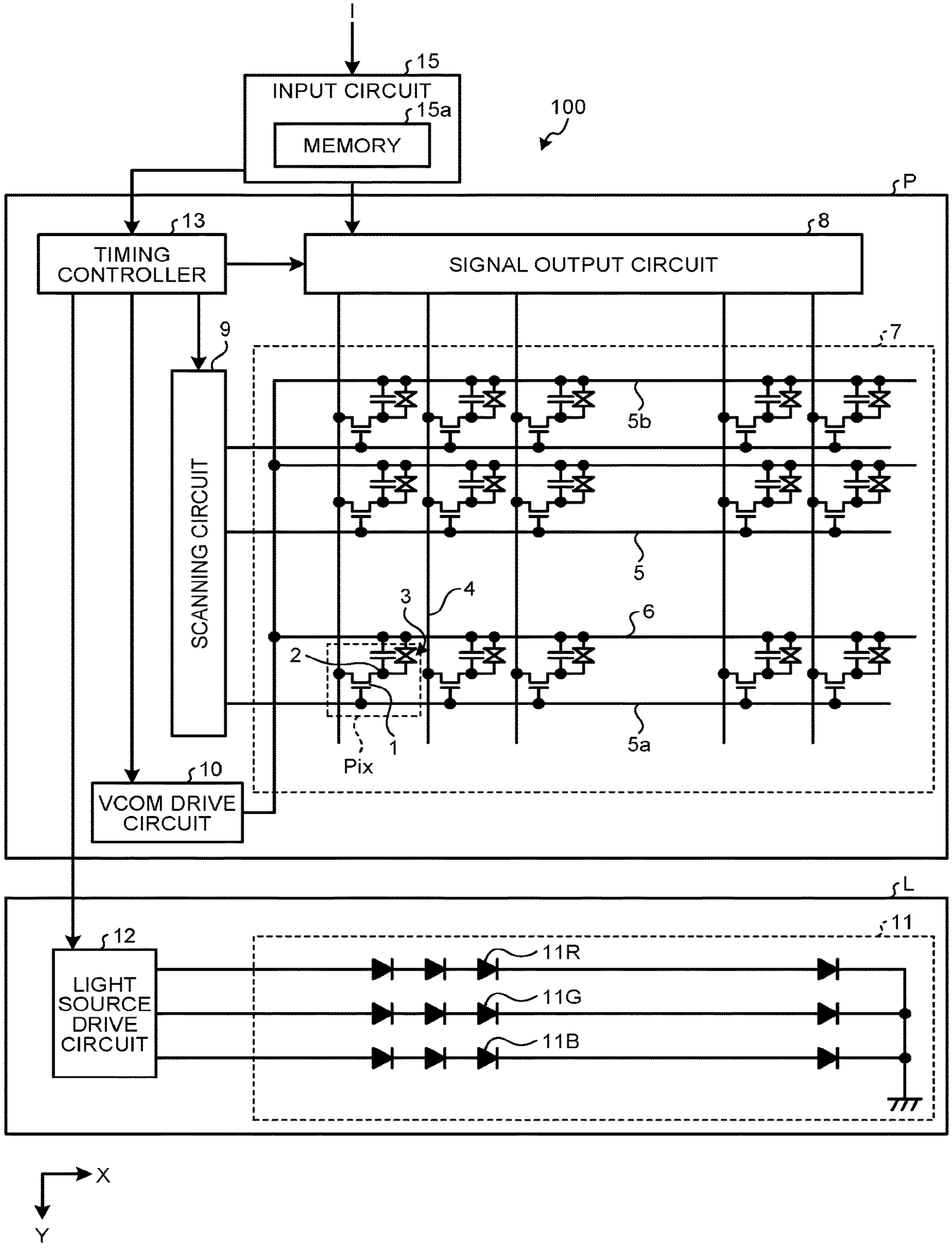
FIG. 1 is a schematic circuit diagram illustrating a main configuration of a display system.

Hereinafter, embodiments of the present invention will be described in detail with reference to the accompanying drawings. What is disclosed herein is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings compared with an actual aspect. However, the drawings are merely examples, and do not limit the interpretation of the present invention. In the present specification and the drawings, the same components as those described in the drawings that have already been discussed are denoted by the same reference numerals, and detailed description thereof will be omitted as appropriate.

In this disclosure, when an element is described as being "on" another element, the element can be directly on the other element, or there can be one or more elements between the element and the other element.

First Embodiment

FIG. 1 is a schematic circuit diagram illustrating a main configuration of a display device 100. The display device 100 includes a liquid crystal display panel P and a light source device L. The liquid crystal display panel P includes a display area 7, a signal output circuit 8, a scanning circuit 9, a common voltage (VCOM) drive circuit 10, a timing controller 13, and a power supply circuit 14. Hereinafter, a surface of the liquid crystal display panel P facing the display area 7 is referred to as a display surface, and the other surface thereof is referred to as a rear surface. Sides of the display device 100 are located in a direction intersecting with (for example, orthogonal to) a facing direction in which the display surface and the rear surface face each other, with respect to the display device 100.

Figure 2:
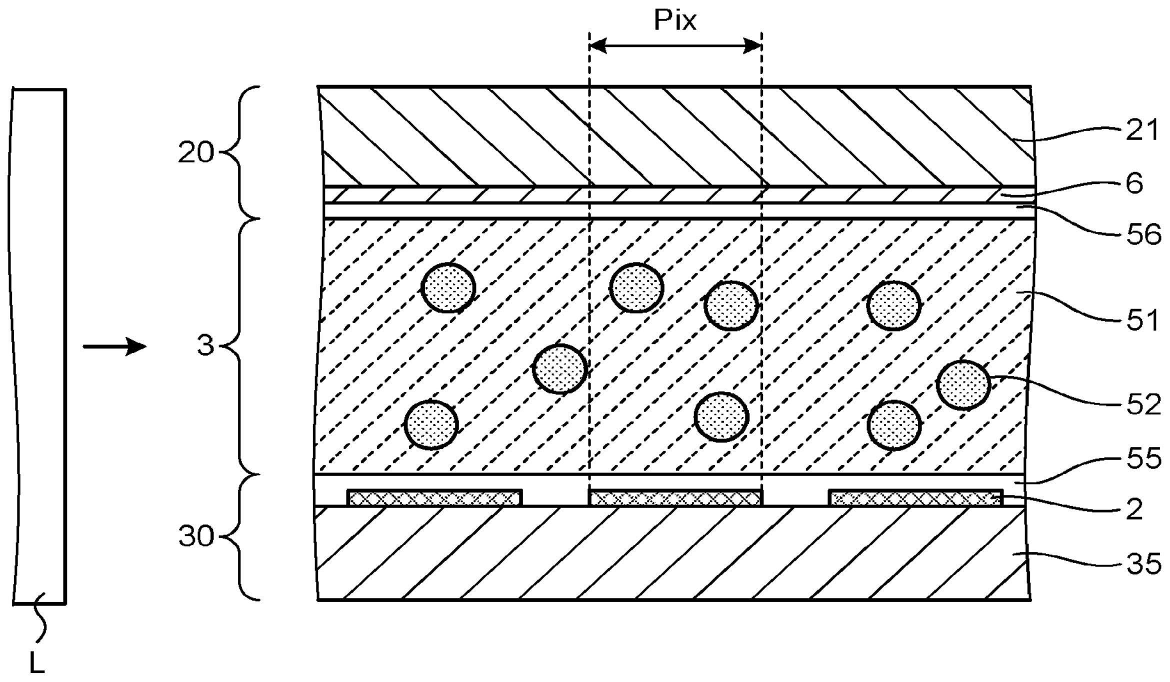
FIG. 2 is a schematic sectional view of a liquid crystal display panel.

A plurality of pixels Pix are disposed in a matrix (row-column configuration) in the display area 7. Each of the pixels Pix includes a switching element 1 and two electrodes. In FIG. 1 and FIG. 2, which will be described later, a pixel electrode 2 and a common electrode 6 are illustrated as the two electrodes.

FIG. 2 is a schematic sectional view of the liquid crystal display panel P. The liquid crystal display panel P includes two substrates facing each other, and liquid crystal 3 sealed between the two substrates. Hereinafter, one of the two substrates is referred to as a first substrate 30, and the other substrate is referred to as a second substrate 20.

The first substrate 30 includes a translucent glass substrate 35, the pixel electrode 2 layered on the second substrate 20 side of the glass substrate 35, and an insulating layer 55 layered on the second substrate 20 side of the glass substrate 35 so as to cover the pixel electrode 2. The pixel electrodes 2 are individually provided for the respective pixels Pix. The second substrate 20 includes a translucent glass substrate 21, the common electrode 6 layered on the first substrate 30 side of the glass substrate 21, and an insulating layer 56 layered on the first substrate 30 side of the common electrode 6 so as to cover the common electrode 6. The common electrode 6 is formed in a plate shape or a film shape and shared among the pixels Pix.

The liquid crystal 3 in the first embodiment is a polymer-dispersed liquid crystal. More specifically, the liquid crystal 3 includes bulk 51 and a plurality of fine particles 52. The orientation of the fine particles 52 varies depending on the potential difference between the pixel electrode 2 and the common electrode 6 in the bulk 51. By individually controlling the potential of the pixel electrode 2 for each pixel Pix, at least one of a degree of translucency and a degree of dispersion is controlled for each pixel Pix.

In the first embodiment described with reference to FIG. 2, the pixel electrodes 2 and the common electrode 6 face each other such that the liquid crystal 3 is interposed therebetween. However, the liquid crystal display panel P may also be configured such that the pixel electrodes 2 and the common electrode 6 are provided on a single substrate and the orientation of the liquid crystal 3 is controlled by the electric field generated by the pixel electrode 2 and the common electrode 6. The liquid crystal 3 may also be liquid crystal other than the polymer-dispersed liquid crystal.

Next, a mechanism for controlling the potential of the pixel electrode 2 and the common electrode 6 will be described. As illustrated in FIG. 1, for example, the switching element 1 is a semiconductor switching element such as a thin film transistor (TFT). One of a source and a drain of the switching element 1 is coupled to one (pixel electrode 2) of the two electrodes. The other of the source and the drain of the switching element 1 is coupled to a signal line 4. A gate of the switching element 1 is coupled to a scanning line 5. Under the control of the scanning circuit 9, the scanning line 5 applies a potential for opening and closing between the source and drain of the switching element 1. The scanning circuit 9 controls the potential.

In the example illustrated in FIG. 1, a plurality of the signal lines 4 are arranged in one (row direction) of the arrangement directions of the pixels Pix. The signal lines 4 extend in the other direction (column direction) of the arrangement directions of the pixels Pix. Each of the signal lines 4 is shared among a plurality of the switching elements 1 of the pixels Pix arranged in the column direction. A plurality of the scanning lines 5 are arranged in the column direction. The scanning lines 5 extend in the row direction. Each of the scanning lines 5 is shared among the switching elements 1 of the pixels Pix arranged in the row direction.

In the explanation of the embodiment, an X direction is the extending direction of the scanning lines 5, and a Y direction is a direction in which the scanning lines 5 are arranged. In FIG. 1, among the scanning lines 5, a scanning line 5*a* is arranged at one end in the Y direction, and a scanning line 5*b* is arranged at the other end in the Y direction.

The common electrode 6 is coupled to the VCOM drive circuit 10. The VCOM drive circuit 10 applies a potential as a common potential to the common electrode 6. The signal output circuit 8 outputs a gradation signal, which will be described later, to each of the signal lines 4, at a timing when the scanning circuit 9 applies a potential as a driving signal to the scanning line 5, thereby charging the liquid crystal (fine particles 52) as a capacitive load and a storage capacitance formed between the pixel electrode 2 and the common electrode 6. Thus, the voltage between the pixel Pix and the common electrode 6 corresponds to the gradation signal. After the application of the driving signal stops, the liquid crystal (fine particles 52) as the capacitive load and the storage capacitance holds the gradation signal. The scattering of the liquid crystal (fine particles 52) is controlled in accordance with the voltage of each pixel Pix and the voltage of the common electrode 6. For example, the liquid crystal 3 may be a polymer-dispersed liquid crystal in which its scattering degree increases as the potential difference (voltage) between each pixel Pix and the common electrode 6 increases. For example, the liquid crystal 3 may also be a polymer-dispersed liquid crystal in which its scattering degree increases as the potential difference (voltage) between each pixel Pix and the common electrode 6 decreases.

As illustrated in FIG. 2, the light source device L is disposed at a side of the liquid crystal display panel P. The light source device L includes a light source 11 and a light source drive circuit 12. The light source 11 includes a first light source 11R that emits red light, a second light source 11G that emits green light, and a third light source 11B that emits blue light. The first light source 11R, the second light source 11G, and the third light source 11B emit light under the control of the light source drive circuit 12. For example, the first light source 11R, the second light source 11G, and the third light source 11B of the first embodiment are light sources that use a light emitting element such as a light emitting diode (LED). However, they are not limited thereto, and the first light source 11R, the second light source 11G, and the third light source 11B are only need to be a light source the light emission timing of which can be controlled. The light source drive circuit 12 controls the light emission timings of the first light source 11R, the second light source 11G, and the third light source 11B under the control of the timing controller 13.

When light is emitted from the light source 11, the display area 7 is illuminated with light emitted from one surface side thereof in the Y direction. The pixels Pix transmit or scatter the light emitted from the one surface side in the Y direction. The scattering degree depends on the state of the liquid crystal 3 controlled in accordance with the gradation signal.

The timing controller 13 is a circuit that controls operation timings of the signal output circuit 8, the scanning circuit 9, the VCOM drive circuit 10, and the light source drive circuit 12. In the embodiment, the timing controller 13 operates based on the signal that is input via an input circuit 15.

The input circuit 15 outputs a signal based on an input signal I (see FIG. 1) from the outside of the display device 100, to the timing controller 13 and the signal output circuit 8. When a pixel signal is a signal indicating RGB gradation values assigned to a certain pixel Pix, the input signal I, which is supplied to the input circuit 15 to output a frame image, is a set of a plurality of the pixel signals for the pixels Pix in the display area 7.

For example, the input circuit 15 in the first embodiment is a field programmable gate array (FPGA) mounted on a flexible print substrate, which is not illustrated, coupled to the liquid crystal display panel P, or a circuit capable of implementing the same function. The input circuit 15 includes a memory 15*a* for holding data of a frame image. During the writing period of each field period, the input circuit 15 outputs line images from the frame image stored in the memory 15*a* on a line image basis, in a manner to be described with reference to FIG. 3 and other figures, which will be described later. In other words, for example, the memory 15*a* may at least have a storage capacity from which a plurality of the line images can be output in a sequence that will be described with reference to FIG. 3. For example, if the memory 15*a* has a capacity capable of storing the frame image of two frames, the input circuit 15 can output, on a line image basis, a frame image of a first frame that is input first and hold a frame image of a second frame that is input subsequent to the frame image of the first frame while the line image is output.

A signal supplied to the timing controller 13 from the input circuit 15 may be the input signal I, or a signal indicating the input timing of the gradation signal generated based on the input signal I. The signal may be any signal as long as information required for controlling the output timing of the driving signal for supplying a gradation signal to each pixel Pix, and the operation timing of the signal output circuit 8 can be obtained by supplying the signal to the timing controller 13 from the input circuit 15.

The frame rate, in other words, the number of frame images to be displayed per second (update frequency of a frame image) is optional. In the first embodiment, for example, the frame rate is 60 [Hz].

Figure 3:
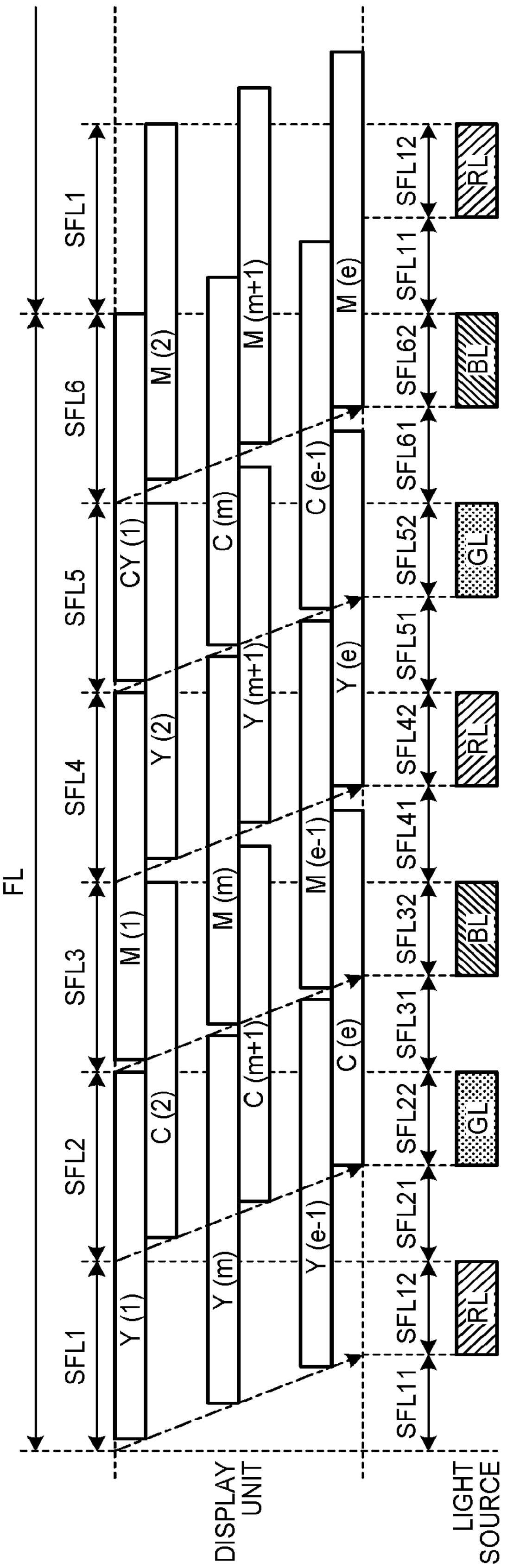
FIG. 3 is a time chart illustrating an example of a field sequential control in a first embodiment.

FIG. 3 is a time chart illustrating an example of a field sequential control in the first embodiment. As illustrated in FIG. 3, in the first embodiment, a time-division color display output method (field sequential color (FSC) method) is used. In the time-division color display output method (FSC method), light sources for light in different colors (for example, the first light source 11R, the second light source 11G, and the third light source 11B) are turned ON at different timings during one frame period FL.

In the time chart of FIG. 3 as well as time charts of FIG. 4 to FIG. 13, which will be described later, a first lighting period RL during which the first light source 11R is turned ON, a second lighting period GL during which the second light source 11G is turned ON, and a third lighting period BL during which the third light source 11B is turned ON are illustrated. The time chart also illustrates which color component among the color components included in the pixel signal corresponds to the gradation signal written during the lighting periods of the light sources. Hereinafter, details will be described.

The one frame period FL includes a plurality of subframe periods SFL1, SFL2, SFL3, SFL4, SFL5, and SFL6. In the one frame period FL in the first embodiment, the subframe period SFL1, the subframe period SFL2, the subframe period SFL3, the subframe period SFL4, the subframe period SFL5, and the subframe period SFL6 are provided in the order of the subframe periods SFL1, SFL2, SFL3, SFL4, SFL5, and SFL6. When the frame rate is 60 [Hz], the rate of the subframe period is 360 [Hz].

In the first embodiment, gradation signals are written on a line basis during writing periods SFL11, SFL21, SFL31, SFL41, SFL51, and SFL61 provided in the respective subframe periods SFL1, SFL2, SFL3, SFL4, SFL5, and SFL6. The lengths of the writing periods are equal to each other, or substantially equal to each other.

During the writing periods SFL11, SFL21, SFL31, SFL41, SFL51, and SFL61, the scanning circuit 9 turns ON thin film transistors (TFTs) provided in the pixels Pix, by outputting the driving signal to the scanning lines 5. The signal output circuit 8 performs signal control for outputting gradation signals to the signal lines 4 to write the gradation signals to the pixels Pix. Consequently, the gradation signals are simultaneously written to the pixels Pix included in a pixel row that are coupled to the same scanning line 5, and that are simultaneously turned ON in accordance with the driving signal to the scanning line 5. When an image written to the pixels Pix in the pixel row coupled to the same scanning line 5 in this manner is referred to as a line image, the frame image is formed of a plurality of the line images that are arranged in the arrangement direction of the scanning lines 5. The line image is an image displayed and output by the pixels Pix that are arranged in the extending direction of the scanning lines 5 (arrangement direction of the signal lines 4). Hereinafter, unless otherwise specifically indicated, when simply referred to as a "line", it refers to the pixel row that outputs the line image. Writing gradation signals "on a line basis" refers to writing the gradation signals to the pixels Pix that are turned ON simultaneously according to the driving signal applied to a single scanning line 5.

Lines written during the writing periods SFL11, SFL31, and SFL51 differ from lines written during the writing periods SFL21, SFL41, and SFL61. More specifically, during the writing periods SFL11, SFL31, and SFL51, gradation signals are written to pixel rows formed of pixels Pix coupled to scanning lines 5 disposed corresponding to odd rows, among the scanning lines 5 arranged from one side to the other (or from the other side to one side) in the Y direction of the display area 7. During the writing periods SFL21, SFL41, and SFL61, gradation signals are written to pixel rows formed of pixels Pix coupled to scanning lines 5 disposed corresponding to even rows, among the scanning lines 5 arranged from one side to the other (or from the other side to one side) in the Y direction of the display area 7. In other words, gradation signals are written to different pixel rows between two subframe periods that are consecutive in time. The gradation signals are written to odd-numbered pixel rows during one of the two subframe periods, and the gradation signals are written to even-numbered pixel rows during the other subframe period.

During the writing periods SFL11, SFL21, SFL31, SFL41, SFL51, and SFL61, gradation signals corresponding to gradation values of any of color components of red (R), green (G), blue (B), cyan (C), magenta (M), and yellow (Y) among the color components included in the pixel signal are written line by line (i.e. on a line basis).

For example, when the pixel signal is expressed by RGB gradation values, it is assumed (R, G, B)=(r1, g1, b1). r1 is the gradation value of red (R) in an input signal that includes information on the RGB gradation values, and functions as a red (R) component in an image to be displayed in the display area 7. g1 is the gradation value of green (G) in the input signal that includes information on the RGB gradation values, and functions as a green (G) component in the image to be displayed in the display area 7. b1 is the gradation value of blue (B) in the input signal that includes information on the RGB gradation values, and functions as a blue (B) component in the image to be displayed in the display area 7. In this example, when both r1 and g1 are not zero, a yellow (Y) component of the gradation value that corresponds to a value of r1 or g1, whichever is smaller, can be extracted from the pixel signal. When both r1 and b1 are not zero, a magenta (M) component of the gradation value that corresponds to a value of r1 or b1, whichever is smaller, can be extracted from the pixel signal. When both g1 and b1 are not zero, a cyan (C) component of the gradation value that corresponds to a value of g1 or b1, whichever is smaller, can be extracted from the pixel signal. When the yellow (Y) component, the magenta (M) component, and the cyan (C) component are respectively expressed as minY (r1, g1), minM (r1, b1), and minC (g1, b1), r1≥minY (r1)+minM (r1) is satisfied. minY(r1) is a part or all of r1 extracted as the yellow (Y) component. minM (r1) is a part or all of r1 extracted as the magenta (M) component. Similarly, in this case, g1≥minY (g1)+minC (g1) is satisfied. In this case, b1≥ minM (b1)+minC (b1) is also satisfied.

For example, in the first embodiment, gradation signals of the yellow (Y) component are written during the writing period SFL11 of the subframe period SFL1. In this example, during the writing period SFL11, the gradation signals are written to pixels Pix coupled to the scanning lines 5 of odd rows. Consequently, during the writing period SFL11, among the color components of the colors included in pixel signals for the pixels Pix included in the input signal I of a frame image to be displayed during the frame period FL, the gradation signals of the yellow (Y) component included in the pixel signals for the pixels Pix coupled to the scanning lines 5 of the odd rows in the display area 7 are written. When the gradation signals are written, the potentials corresponding to the gradation signals are applied to the pixels Pix from the signal output circuit 8.

During the writing periods SFL11, SFL21, SFL31, SFL41, SFL51, and SFL61, the timing to output the driving signal by the scanning circuit 9 is synchronized with the timing to output the gradation signals by the signal output circuit 8, and thus the gradation signals are written line by line (i.e. on a line basis). In other words, the scanning circuit 9 applies the driving signal to the scanning lines 5 corresponding to the writing periods at different timings. The signal output circuit 8 outputs gradation signals to the pixels Pix coupled to the scanning line 5 supplied with the driving signal.

For example, in the writing period SFL11 in FIG. 3, a period during which the gradation signals of the yellow (Y) component are applied to the first odd row (1) on a line basis and held, is illustrated by a rectangular frame of "Y(1)". A period during which the gradation signals of the yellow (Y) component are applied on a line basis to another odd row (m), to which the gradation signals are written subsequent to the first odd row (1), and held, is illustrated by a rectangular frame of "Y(m)". A period during which the gradation signals of the yellow (Y) component are applied to the last odd row (e−1) on a line basis and held, is illustrated by a rectangular frame of "Y(e−1)". In this manner, during the writing period SFL11, scanning for sequentially writing the line images (gradation signals) of the yellow (Y) component among the line images to be written to the display area 7 is performed on the pixels Pix that form the lines of odd rows (hereinafter, simply referred to as lines of odd rows), in the order of, for example, Y(1), . . . , Y(m), . . . , and Y(e−1). The first odd row (1) is a pixel row to which the gradation signals are written first among the odd rows. The last odd row (e−1) is a pixel row to which the gradation signals are written last among the odd rows, and the write timing of the gradation signals is after that of the other odd row (m).

Thus, the rectangular frames included in the section of the "display area" in each of FIG. 3 and from FIG. 4 to FIG. 11, which will be described later, express the respective lines that form the display area 7, have the color components of gradation signals written thereto, and hold the color components of the gradation signals therein until updated, using a combination of a "sign of a color component to be written" and a "sign of the pixel row to which the color component is to be written". The "sign of the color component to be written" is one of red (R), green (G), blue (B), cyan (C), magenta (M), and yellow (Y). The "sign of the pixel row to which the color component is to be written" is one of the first odd row (1), another odd row (m), the last odd row (e−1), the first even row (2), another even row (m+1), and the last even row (e). The first even row (2) is a pixel row to which gradation signals are written first, among the even rows. The last even row (e) is a pixel row to which gradation signals are written last among the even rows, and the write timing of the gradation signals is after that of the other even row (m+1).

For example, a period during which the gradation signals of the red (R) component are applied to the first odd row (1) on a line basis and held, is illustrated by a rectangular frame of "R(1)". A period during which the gradation signals of the green (G) component are applied to the other odd row (m) on a line basis and held, is illustrated by a rectangular frame of "G(m)". A period during which the gradation signals of the blue (B) component are applied to the last odd row (e−1) on a line basis and held, is illustrated by a rectangular frame of "B(e−1)". A period during which the gradation signals of the cyan (C) component are applied to the first even row (2) on a line basis and held, is illustrated by a rectangular frame of "C(2)". A period during which the gradation signals of the magenta (M) component are applied on a line basis to the other even row (m+1), to which the gradation signals are written subsequent to the first even row (2), and held, is illustrated by a rectangular frame of "M(m+1)". A period during which the gradation signals of the yellow (Y) component are applied on a line basis to the last even row (e) and held, is illustrated by a rectangular frame of "Y(e)".

As described above, during the writing period SFL11, scanning for sequentially writing the line images (gradation signals) of the yellow (Y) component is performed on the pixels Pix that form the lines of odd rows, in the order of, for example, Y(1), . . . , Y(m), . . . , and Y(e−1). Similarly, the other writing periods will also be explained by using the combination of the "sign of the color component to be written" and the "sign of the pixel row to which the color component is to be written".

As illustrated in FIG. 3, in the first embodiment, during the writing period SFL21, scanning for sequentially writing the line images of the cyan (C) component among the line images to be written to the display area 7 is performed on the pixels Pix that form the lines of even rows (hereinafter, simply referred to as the lines of even rows), in the order of, for example, C(2), . . . , C(m+1), . . . , and C(e). During the writing period SFL31, scanning for sequentially writing the line images of the magenta (M) component is performed on the pixels Pix that form the lines of odd rows, in the order of, for example, M(1), . . . , M(m), . . . , and M(e−1). Consequently, the line images written during the writing period SFL11 are updated. During the writing period SFL41, scanning for sequentially writing the line images of the yellow (Y) component is performed on the pixels Pix that form the lines of even rows, in the order of, for example, Y(2), . . . , Y (m+1), . . . , and Y(e). Consequently, the line images written during the writing period SFL21 are updated. During the writing period SFL51, scanning for sequentially writing the line images of the cyan (C) component is performed on the pixels Pix that form the lines of odd rows, in the order of, for example, C(1), C(m), . . . , and C(e−1). Consequently, the line image written during the writing period SFL31 is updated. During the writing period SFL61, scanning for sequentially writing the line images of the magenta (M) component is performed on the pixels Pix that form the lines of even rows, in the order of, for example, M(2), . . . , M(m+1), . . . , and M(e). Consequently, the line images written during the writing period SFL41 are updated.

After one frame period FL is finished, a frame period FL for displaying the next frame image starts. Thus, during the writing period SFL11 of the next frame period FL, the line images written during the writing period SFL51 of the preceding frame period FL are updated. During the writing period SFL21 of the next frame period FL, the line images written during the writing period SFL61 of the preceding frame period FL are updated.

In the first embodiment, lighting periods SFL12, SFL22, SFL32, SFL42, SFL52, and SFL62 provided in the respective subframe periods SFL1, SFL2, SFL3, SFL4, SFL5, and SFL6 correspond to the lighting periods during which the light sources of the colors corresponding to the color components of the written gradation signals are turned ON. The lighting period SFL12 is provided subsequent to the writing period SFL11. The lighting period SFL22 is provided subsequent to the writing period SFL21. The lighting period SFL32 is provided subsequent to the writing period SFL31. The lighting period SFL42 is provided subsequent to the writing period SFL41. The lighting period SFL52 is provided subsequent to the writing period SFL51. The lighting period SFL62 is provided subsequent to the writing period SFL61. The lengths of the lighting periods are substantially equal to each other.

More specifically, in the first embodiment, the lighting period SFL12 corresponds to the first lighting period RL. During a period corresponding to frame image data supplied first to the liquid crystal display panel P, the first light source 11R is turned ON, even though only the line images of the yellow (Y) component are written at this point. The lighting period SFL22 corresponds to the second lighting period GL. The lighting period SFL32 corresponds to the third lighting period BL. The lighting period SFL42 corresponds to the first lighting period RL. The lighting period SFL52 corresponds to the second lighting period GL. The lighting period SFL62 corresponds to the third lighting period BL.

The pixel Pix supplied with the gradation signal of the yellow (Y) component scatters the red (R) light during one of the two lighting periods included in the period during which the gradation signal is held, and scatters the green (G) light during the other lighting period. Consequently, the yellow (Y) component is reproduced by synthetic light of the red (R) light and the green (G) light. More specifically, the lines of Y(1), . . . , Y(m), . . . , and Y(e−1) to which gradation signals are written during the writing period SFL11 and in which the gradation signals are held until updated during the writing period SFL31, scatter the red (R) light during the lighting period SFL12 corresponding to the first lighting period RL and scatter the green (G) light during the lighting period SFL22 corresponding to the second lighting period GL. Consequently, the lines of Y(1), . . . , Y(m), . . . , and Y(e−1) reproduce the yellow (Y) component. The same applies to a relation between the color components of the gradation signals to be written to the other lines, and the colors of light to be emitted during the two lighting periods included in the period during which the gradation signals are held. If the color component of the gradation signal to be written is cyan (C), one of the two lighting periods included in the period during which the gradation signal is held is the second lighting period GL, and the other lighting period is the third lighting period BL. If the color component of the gradation signal to be written is magenta (M), one of the two lighting periods included in the period during which the gradation signal is held is the first lighting period RL, and the other lighting period is the third lighting period BL. The color reproduction of the line images that are written during the writing period SFL61 of the preceding frame period FL of the two consecutive frame periods FL, and that are held during the subframe period SFL1 of the subsequent frame period FL, is achieved by synthetic light of the light emitted during the lighting period SFL62 of the preceding frame period FL, and the light emitted during the lighting period SFL12 of the subsequent frame period FL.

When the color component of the gradation signal to be written is red (R), the two lighting periods included in the period during which the gradation signal is held are first lighting periods RL, although not illustrated in FIG. 3 that is referred to in the first embodiment. When the color component of the gradation signal to be written is green (G), the two lighting periods included in the period during which the gradation signal is held are second lighting periods GL. When the color component of the gradation signal to be written is blue (B), the two lighting periods included in the period during which the gradation signal is held are third lighting periods BL.

For example, the timing controller 13 operates and controls the signal output circuit 8, the scanning circuit 9, and the light source drive circuit 12 in the frame period FL. In the embodiment, for example, the input circuit 15 performs an extraction process of color components corresponding to the line images to be written during the writing periods (for example, the writing periods SFL11, SFL21, SFL31, SFL41, SFL51, and SFL61). The configuration for performing the control and process is merely an example and is not limited thereto. The configuration may be modified as appropriate, and for example, a dedicated circuit may be provided.

In the first embodiment, when there is a color component not extracted from a pixel signal, the color component not extracted does not affect the gradation signal. However, this is merely an example of a method of processing the color component not extracted, and the method is not limited thereto and may be modified as appropriate. For example, if it is possible by assigning the color component not extracted to an adjacent pixel to cause the color component not extracted to affect the gradation signal, the color component not extracted may be assigned to the adjacent pixel.

As described above, in the first embodiment, the display device 100 includes the display panel (for example, the liquid crystal display panel P) that has the pixel rows to which the line images are written, and that displays a frame image by arranging the line images in the scanning direction; and the light source 11 that emits light to the display panel. The light source 11 includes the first light source 11R that emits red (R) light, the second light source 11G that emits green (G) light, and the third light source 11B that emits blue (B) light. The display period (frame period FL) of the frame image includes six subframe periods (for example, the subframe periods SFL1, SFL2, SFL3, SFL4, SFL5, and SFL6). Each of the subframe periods includes a writing period (for example, the writing period SFL11, SFL21, SFL31, SFL41, SFL51, or SFL61) of the line image, and a lighting period (for example, the lighting period SFL12, SFL22, SFL32, SFL42, SFL52, or SFL62) during which the first light source 11R, the second light source 11G, or the third light source 11B is turned ON. The line image of a color component that corresponds to a combination of light emitted during the lighting period of a preceding subframe period of the two consecutive subframe periods, and light emitted during the lighting period of a subsequent subframe period of two consecutive subframe periods is written during the writing period of the preceding subframe period. The six subframe periods include a first subframe period and a second subframe period that are provided alternately and consecutively. The first subframe period includes the writing period during which the line image corresponding to the first pixel row (for example, (1), . . . , (m), . . . , or (e−1) in FIG. 3) included in the pixel rows is written; and the second subframe period includes the writing period during which the line image corresponding to the second pixel row (for example, (2), . . . , (m+1), . . . , or (e) in FIG. 3) included in the pixel rows and adjacent to the first pixel row is written. Consequently, the light source 11 is turned ON twice during a period when the line image of a single color is held. In this manner, by shifting the cycle of the writing periods and the cycle of the lighting periods, and by turning ON the light source 11 a greater number of times than the lighting period of the line image, it is possible to reduce color breakup.

One of the first pixel row and the second pixel row is an odd-numbered pixel row (for example, (1), . . . , (m), . . . , or (e−1) in FIG. 3) arranged in the scanning direction, and the other of the first pixel row and the second pixel row is an even-numbered pixel row (for example, (2), . . . , (m+1), . . . , or (e) in FIG. 3) arranged in the scanning direction. Consequently, it is possible to increase the number of times of the writing period with respect to the frame rate. It is also possible to disperse the positions of the lines to be updated during the writing periods, and the line update can be hardly visible.

The six subframe periods: the subframe period SFL1, the subframe period SFL2, the subframe period SFL3, the subframe period SFL4, the subframe period SFL5, and the subframe period SFL6, are provided consecutively in the order of the subframe periods SFL1, SFL2, SFL3, SFL4, SFL5, and SFL6. The subframe period SFL1 includes the writing period SFL11 during which the line image corresponding to the yellow (Y) component is written to the first pixel row, and the lighting period SFL12 during which the first light source 11R is turned ON. The subframe period SFL2 includes the writing period SFL21 during which the line image corresponding to the cyan (C) component is written to the second pixel row, and the lighting period SFL22 during which the second light source 11G is turned ON. The subframe period SFL3 includes the writing period SFL31 during which the line image corresponding to the magenta (M) component is written to the first pixel row, and the lighting period SFL32 during which the third light source 11B is turned ON. The subframe period SFL4 includes the writing period SFL41 during which the line image corresponding to the yellow (Y) component is written to the second pixel row, and the lighting period SFL42 during which the first light source 11R is turned ON. The subframe period SFL5 includes the writing period SFL51 during which the line image corresponding to the cyan (C) component is written to the first pixel row, and the lighting period SFL52 during which the second light source 11G is turned ON. The subframe period SFL6 includes the writing period SFL61 during which the line image corresponding to the magenta (M) component is written to the second pixel row, and the lighting period SFL62 during which the third light source 11B is turned ON. Consequently, it is possible to adjust the color balance between the first half and the second half of the frame period FL.

The liquid crystal display panel P is a display panel in which the polymer-dispersed liquid crystal is sealed between the two facing substrates (for example, the second substrate 20 and the first substrate 30). Consequently, the control using the six subframe periods SFL1, SFL2, SFL3, SFL4, SFL5, and SFL6 described above may be applied to what is called a see-through display device in which a view on the background side of the liquid crystal display panel P can be seen through the liquid crystal display panel P.

Second Embodiment

Hereinafter, a display device of a second embodiment will be described in detail with reference to FIG. 4 and FIG. 5. In the description of the second embodiment, the same components as those in the first embodiment are denoted by the same reference numerals, and the description thereof will be omitted.

Figure 4:
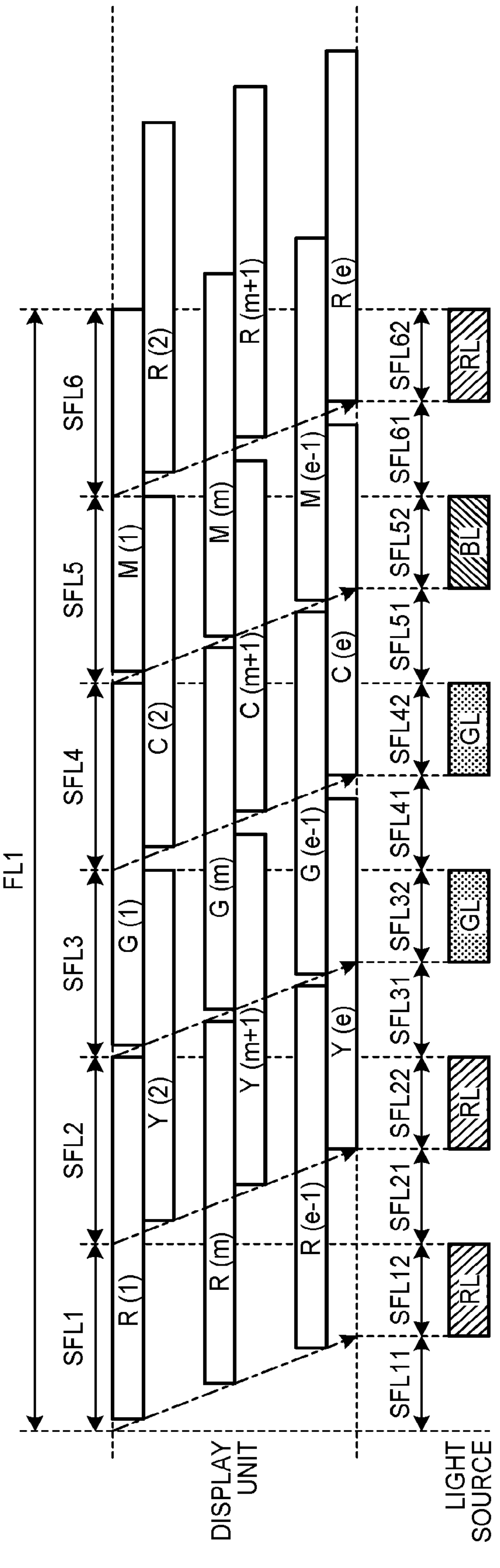
FIG. 4 is a time chart illustrating an example of a field sequential control in a second embodiment.
Figure 5:
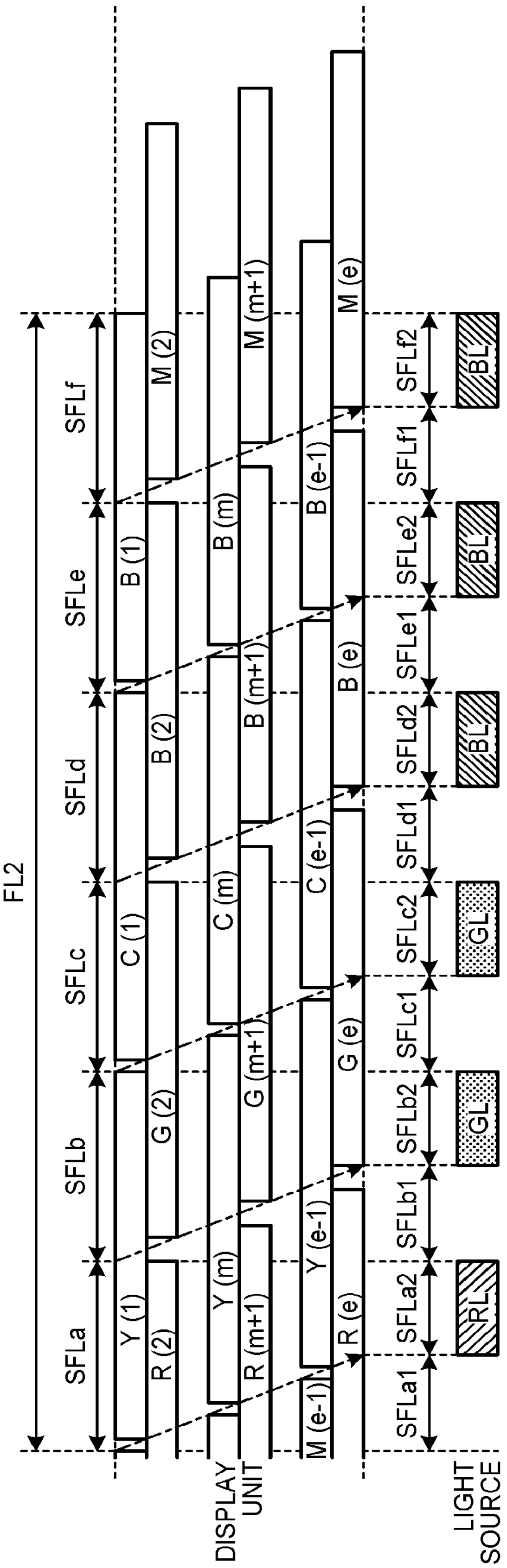
FIG. 5 is a time chart illustrating an example of a field sequential control in the second embodiment.

FIG. 4 and FIG. 5 are time charts illustrating an example of a field sequential control in the second embodiment. In the second embodiment, the color components of gradation signals and the colors of light are controlled in units of two consecutive frame periods. More specifically, in the second embodiment, a first frame period FL1 illustrated in FIG. 4 and a second frame period FL2 illustrated in FIG. 5 are alternately provided.

Hereinafter, the color component of gradation signals and the color of light in each of the subframe periods SFL1, SFL2, SFL3, SFL4, SFL5, and SFL6 included in the first frame period FL1 are controlled in a manner similar to those in the first embodiment. In describing the second frame period FL2, to avoid confusion with the subframe periods SFL1, SFL2, SFL3, SFL4, SFL5, and SFL6 included in the first frame period FL1, the subframe periods in the second frame period FL2 are assigned reference sings SFLa, SFLb, SFLc, SFLd, SFLe, and SFLf. The writing periods included in the subframe periods SFLa, SFLb, SFLc, SFLd, SFLe, and SFLf are assigned reference signs SFLa1, SFLb1, SFLc1, SFLd1, SFLe1, and SFLf1. The lighting periods included in the subframe periods SFLa, SFLb, SFLc, SFLd, SFLe, and SFLf are assigned reference signs SFLa2, SFLb2, SFLc2, SFLd2, SFLe2, and SFLf2. The color component of gradation signals and the color of light in each of the subframe periods SFLa, SFLb, SFLc, SFLd, SFLe, and SFLf included in the second frame period FL2 are controlled in a manner similar to those in the subframe periods SFL1, SFL2, SFL3, SFL4, SFL5, and SFL6 in the first embodiment.

In the second embodiment, as illustrated in FIG. 4, during the writing period SFL11, scanning for sequentially writing the line images (gradation signals) of the red (R) component is performed on the pixels Pix that form the lines of odd rows, in the order of, for example, R(1), . . . , R(m), . . . , and R(e−1). During the writing period SFL21, scanning for sequentially writing the line images of the yellow (Y) component is performed on the pixels Pix that form the lines of even rows, in the order of, for example, Y(2), . . . , Y(m+1), . . . , and Y(e). During the writing period SFL31, scanning for sequentially writing the line images of the green (G) component is performed on the pixels Pix that form the lines of odd rows, in the order of, for example, G(1), . . . , G(m), . . . , and G(e−1). Consequently, the line images written during the writing period SFL11 are updated. During the writing period SFL41, scanning for sequentially writing the line images of the cyan (C) component is performed on the pixels Pix that form the lines of even rows, in the order of, for example, C(2), . . . , C(m+1), . . . , and C(e). Consequently, the lines written during the writing period SFL21 are updated. During the writing period SFL51, scanning for sequentially writing the line images of the magenta (M) component is performed on the pixels Pix that form the lines of odd rows, in the order of, for example, M(1), . . . , M(m), and . . . M(e−1). Consequently, the line images written during the writing period SFL31 are updated. During the writing period SFL61, scanning for sequentially writing the line images of the red (R) component is performed on the pixels Pix that form the lines of even rows, in the order of, for example, R(2), . . . , R(m+1), . . . , and R(e). Consequently, the line images written during the writing period SFL41 are updated.

The lighting period SFL12 corresponds to the first lighting period RL. The lighting period SFL22 corresponds to the first lighting period RL. The lighting period SFL32 corresponds to the second lighting period GL. The lighting period SFL42 corresponds to the second lighting period GL. The lighting period SFL52 corresponds to the third lighting period BL. The lighting period SFL62 corresponds to the first lighting period RL.

As illustrated in FIG. 5, during the writing period SFLa1, scanning for sequentially writing the line images of the yellow (Y) component is performed on the pixels Pix that form the lines of odd rows, in the order of, for example, Y(1), . . . , Y(m), . . . , and Y(e−1). Consequently, the line images written during the writing period SFL51 are updated. In other words, the line images of the magenta (M) component of M(l), . . . , M(m), . . . and M(e−1) written during the writing period SFL51 are held until the writing period SFLa1. During the writing period SFLb1, scanning for sequentially writing the line images of the green (G) component is performed on the pixels Pix that form the lines of even rows, in the order of, for example, G(2), . . . , G(m+1), . . . , and G(e). Consequently, the line images written during the writing period SFL61 are updated. In other words, the line images of the red (R) component of R(2), . . . , R(m+1), . . . , and R(e) written during the writing period SFL61 are held until the writing period SFLb1. During the writing period SFLc1, scanning for sequentially writing the line images of the cyan (C) component is performed on the pixels Pix that form the lines of odd rows, in the order of, for example, C(1), . . . , C(m), . . . , and C(e−1). Consequently, the line images written during the writing period SFLa1 are updated. During the writing period SFLd1, scanning for sequentially writing the line images of the blue (B) component is performed on the pixels Pix that form the lines of even rows, in the order of, for example, B(2), . . . , B(m+1), . . . , and B(e). Consequently, the line images written during the writing period SFLb1 are updated. During the writing period SFLe1, scanning for sequentially writing the line images of the blue (B) component is performed on the pixels Pix that form the lines of odd rows, in the order of, for example, B(1), . . . , B(m), . . . , and B(e−1). Consequently, the line images written during the writing period SFLc1 are updated. During the writing period SFLf1, scanning for sequentially writing the line images of the magenta (M) component is performed on the pixels Pix that form the lines of even rows, in the order of, for example, M(2), . . . , M(m+1), . . . , and M(e). Consequently, the line images written during the writing period SFLd1 are updated.

The lighting period SFLa2 corresponds to the first lighting period RL. The lighting period SFLb2 corresponds to the second lighting period GL. The lighting period SFLc2 corresponds to the second lighting period GL. The lighting period SFLd2 corresponds to the third lighting period BL. The lighting period SFLe2 corresponds to the third lighting period BL. The lighting period SFLf2 corresponds to the third lighting period BL.

During the writing period SFL11 of the first frame period FL1 subsequent to the second frame period FL2, the line images written during the writing period SFLe1 of the preceding second frame period FL2 are updated. During the writing period SFL21 of the first frame period FL1, the line images written during the writing period SFLf1 of the preceding second frame period FL2 are updated. The color of the line images that are written during the writing period SFL61 of the first frame period FL1 and that are held during the subframe period SFLa of the second frame period FL2 is reproduced by synthetic light of the light emitted during the lighting period SFL62 of the first frame period FL1, and the light emitted during the lighting period SFLa2 of the second frame period FL2. The color of the line images that are written during the writing period SFLf1 of the second frame period FL2 and that are held during the subframe period SFL1 of the subsequent first frame period FL1 is reproduced by synthetic light of the light emitted during the lighting period SFLf2 of the second frame period FL2, and the light emitted during the lighting period SFL12 of the first frame period FL1.

As described above, in one of the two consecutive display periods (first frame period FL1) in the second embodiment, the six subframe periods: the subframe period SFL1, the subframe period SFL2, the subframe period SFL3, the subframe period SFL4, the subframe period SFL5, and the subframe period SFL6, are provided consecutively in the order of the subframe periods SFL1, SFL2, SFL3, SFL4, SFL5, and SFL6. The subframe period SFL1 includes the writing period SFL11 during which the line image corresponding to the red (R) component is written to the first pixel row, and the lighting period SFL12 during which the first light source 11R is turned ON. The subframe period SFL2 includes the writing period SFL21 during which the line image corresponding to the yellow (Y) component is written to the second pixel row, and the lighting period SFL22 during which the first light source 11R is turned ON. The subframe period SFL3 includes the writing period SFL31 during which the line image corresponding to the green (G) component is written to the first pixel row, and the lighting period SFL32 during which the second light source 11G is turned ON. The subframe period SFL4 includes the writing period SFL41 during which the line image corresponding to the cyan (C) component is written to the second pixel row, and the lighting period SFL42 during which the second light source 11G is turned ON. The subframe period SFL5 includes the writing period SFL51 during which the line image corresponding to the magenta (M) component is written to the first pixel row, and the lighting period SFL52 during which the third light source 11B is turned ON. The subframe period SFL6 includes the writing period SFL62 during which the line image corresponding to the red (R) component is written to the second pixel row, and the lighting period SFL62 during which the first light source 11R is turned ON. In the other of the two consecutive display periods (second frame period FL2), the six subframe periods: the subframe period SFLa, the subframe period SFLb, the subframe period SFLc, the subframe period SFLd, the subframe period SFLe, and the subframe period SFLf, are provided consecutively in the order of the subframe periods SFLa, SFLb, SFLc, SFLd, SFLe, and SFLf. The subframe period SFLa includes the writing period SFLa1 during which the line image corresponding to the yellow (Y) component is written to the first pixel row, and the lighting period SFLa2 during which the first light source 11R is turned ON. The subframe period SFLb includes the writing period SFLb1 during which the line image corresponding to the green (G) component is written to the second pixel row, and the lighting period SFLb2 during which the second light source 11G is turned ON. The subframe period SFLc includes the writing period SFLc1 during which the line image corresponding to the cyan (C) component is written to the first pixel row, and the lighting period SFLc2 during which the second light source 11G is turned ON. The subframe period SFLd includes the writing period SFLd1 during which the line image corresponding to the blue (B) component is written to the second pixel row, and the lighting period SFLd2 during which the third light source 11B is turned ON. The subframe period SFLe includes the writing period SFLe1 during which the line image corresponding to the blue (B) component is written to the first pixel row, and the lighting period SFLe2 during which the third light source 11B is turned ON. The subframe period SFLf includes the writing period SFLf1 during which the line image corresponding to the magenta (M) component is written to the second pixel row, and the lighting period SFLf2 during which the third light source 11B is turned ON. Consequently, it is possible to obtain a color gamut (for example, a color gamut T4 in FIG. 14, which is described later) larger than that of the first embodiment.

Third Embodiment

Hereinafter, a display device of a third embodiment will be described in detail with reference to FIG. 6 and FIG. 7. In the description of the third embodiment, the same components as those in the second embodiment are denoted by the same reference numerals, and the description thereof will be omitted.

Figure 6:
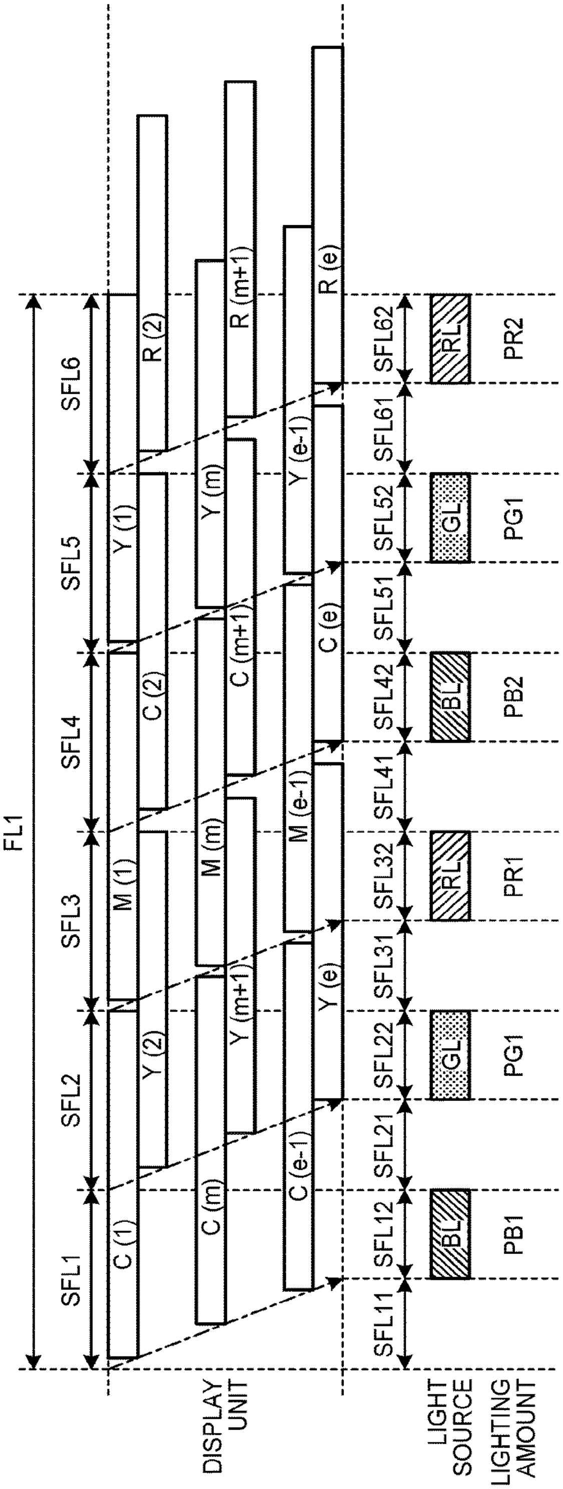
FIG. 6 is a time chart illustrating an example of a field sequential control in a third embodiment.
Figure 7:
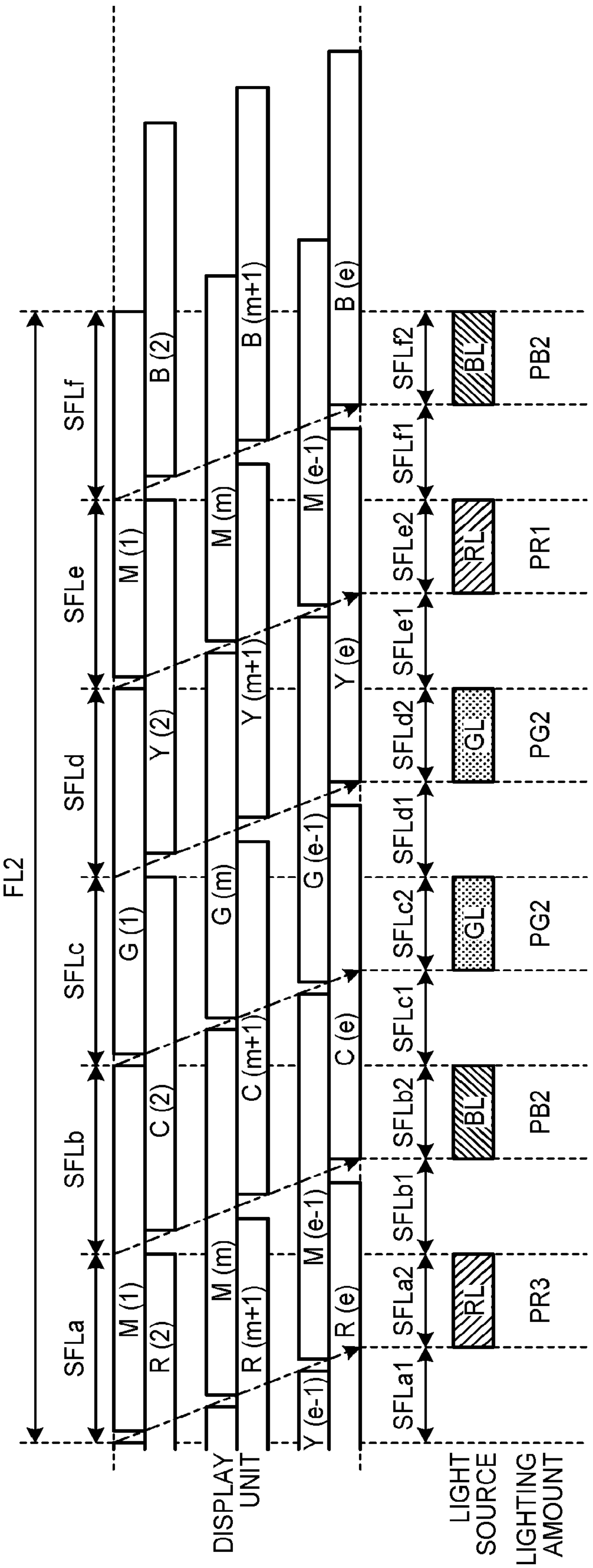
FIG. 7 is a time chart illustrating an example of a field sequential control in the third embodiment.

FIG. 6 and FIG. 7 are time charts illustrating an example of a field sequential control in the third embodiment. In the third embodiment, as illustrated in FIG. 6, during the writing period SFL11, scanning for sequentially writing the line images of the cyan (C) component is performed on the pixels Pix that form the lines of odd rows, in the order of, for example, C(1), . . . , C(m), . . . , and C(e−1). During the writing period SFL21, scanning for sequentially writing the line images of the yellow (Y) component is performed on the pixels Pix that form the lines of even rows, in the order of, for example, Y(2), . . . , Y(m+1), . . . , and Y(e). During the writing period SFL31, scanning for sequentially writing the line images of the magenta (M) component is performed on the pixels Pix that form the lines of odd rows, in the order of, for example, M(1), . . . , M(m), . . . , and M(e−1). During the writing period SFL41, scanning for sequentially writing the line images of the cyan (C) component is performed on the pixels Pix that form the lines of even rows, in the order of, for example, C(2), . . . , C(m+1), . . . , and C(e). During the writing period SFL51, scanning for sequentially writing the line images of the yellow (Y) component is performed on the pixels Pix that form the lines of odd rows, in the order of, for example, Y(1), . . . , Y(m), . . . , and Y(e−1). During the writing period SFL61, scanning for sequentially writing the line images of the red (R) component is performed on the pixels Pix that form the lines of even rows, in the order of, for example, R(2), . . . , R(m+1), . . . , and R(e).

The lighting period SFL12 corresponds to the third lighting period BL. The lighting period SFL22 corresponds to the second lighting period GL. The lighting period SFL32 corresponds to the first lighting period RL. The lighting period SFL42 corresponds to the third lighting period BL. The lighting period SFL52 corresponds to the second lighting period GL. The lighting period SFL62 corresponds to the first lighting period RL.

As illustrated in FIG. 7, during the writing period SFLa1, scanning for sequentially writing the line images of the magenta (M) component is performed on the pixels Pix that form the lines of odd rows, in the order of, for example, M(l), . . . , M(m), . . . , and M(e−1). In other words, the line images of the yellow (Y) component of Y(1), . . . , Y(m), . . . , and Y(e−1) written during the writing period SFL51 are held until the writing period SFLa1. During the writing period SFLb1, scanning for sequentially writing the line images of the cyan (C) component is performed on the pixels Pix that form the lines of even rows, in the order of, for example, C(2), . . . , C(m+1), . . . , and C(e). In other words, the line images of the red (R) component of R(2), . . . , R(m+1), . . . , and R(e) written during the writing period SFL61 are held until the writing period SFLb1. During the writing period SFLc1, scanning for sequentially writing the line images of the green (G) component is performed on the pixels Pix that form the lines of odd rows, in the order of, for example, G(1), . . . , G(m), . . . , and G(e−1). During the writing period SFLd1, scanning for sequentially writing the line images of the yellow (Y) component is performed on the pixels Pix that form the lines of even rows, in the order of, for example, Y(2), . . . , Y(m+1), . . . , and Y(e). During the writing period SFLe1, scanning for sequentially writing the line images of the magenta (M) component is performed on the pixels Pix that form the lines of odd rows, in the order of, for example, M(1), . . . , M(m), . . . , and M(e−1). During the writing period SFLf1, scanning for sequentially writing the line images of the blue (B) component is performed on the pixels Pix that form the lines of even rows, in the order of, for example, B(2), . . . , B(m+1), . . . , and B(e).

The lighting period SFLa2 corresponds to the first lighting period RL. The lighting period SFLb2 corresponds to the third lighting period BL. The lighting period SFLc2 corresponds to the second lighting period GL. The lighting period SFLd2 corresponds to the second lighting period GL. The lighting period SFLe2 corresponds to the first lighting period RL. The lighting period SFLf2 corresponds to the third lighting period BL.

In the third embodiment, when a light source of the same color is turned ON during two lighting periods included in the consecutive subframe periods, the lighting amount of the light source during at least one of the two lighting periods is less than the lighting amount of light sources of different colors when those light sources are respectively turned ON during the two lighting periods included in the consecutive subframe periods. For example, the lighting amount such as above is controlled by the timing controller 13. Alternatively, the lighting amount may be controlled by the light source drive circuit 12, or by a dedicated circuit for controlling the lighting amount.

The first frame period FL1 and the second frame period FL2 are alternately provided. Consequently, the lighting period SFL12 and the lighting period SFLf2 correspond to the two lighting periods included in the consecutive subframe periods. The lighting period SFL12 and the lighting period SFLf2 are the third lighting periods BL. As illustrated in the section of the "lighting amount" in FIG. 6 and FIG. 7, a lighting amount PB1 of the third light source 11B during the third lighting period BL of the lighting period SFL12 is different from a lighting amount PB2 of the third light source 11B during the third lighting periods BL of the lighting period SFL42, the lighting period SFLb2, and the lighting period SFLf2. More specifically, the lighting amount PB1 is less than the lighting amount PB2. For example, when the ratio of the lighting amounts is expressed by a 12-bit numerical value (0 to 4095), the ratio between the lighting amount PB1 and the lighting amount PB2 is 1000:4095.

The lighting period SFLc2 and the lighting period SFLd2 correspond to the two lighting periods included in the consecutive subframe periods. The lighting period SFLc2 and the lighting period SFLd2 are the second lighting periods GL. In this example, as illustrated in the section of the "lighting amount" in FIG. 6 and FIG. 7, a lighting amount PG1 of the second light source 11G during the second lighting periods GL of the lighting period SFL22 and the lighting period SFL52 is different from a lighting amount PG2 of the second light source 11G during the second lighting periods GL of the lighting period SFLc2 and the lighting period SFLd2. More specifically, the lighting amount PG2 is less than the lighting amount PG1. For example, when the ratio of the lighting amounts is expressed by a 12-bit numerical value (0 to 4095), the ratio between the lighting amount PG1 and the lighting amount PG2 is 4095:3000.

The lighting period SFL62 and the lighting period SFLa2 correspond to the two lighting periods included in the consecutive subframe periods. The lighting period SFL62 and the lighting period SFLa2 are the first lighting periods RL. In this example, as illustrated in the section of the "lighting amount" in FIG. 6 and FIG. 7, a lighting amount PR1 of the first light source 11R during the first lighting periods RL of the lighting period SFL32 and the lighting period SFLe2, a lighting amount PR2 of the first light source 11R during the first lighting period RL of the lighting period SFL62, and a lighting amount PR3 of the first light source 11R during the first lighting period RL of the lighting period SFLa2 are different from one another. More specifically, the lighting amount PR2 and the lighting amount PR3 are less than the lighting amount PR1. The lighting amount PR2 is less than the lighting amount PR3. For example, when the ratio of the lighting amounts is expressed by a 12-bit numerical value (0 to 4095), the ratio between the lighting amount PR1, the lighting amount PR2, and the lighting amount PR3 is 4095:1000:3000. The ratio of the lighting amounts described in the example is merely an example and is not limited thereto, and can be modified as appropriate within a range in which the magnitude relation between the lighting amounts is not changed.

The "lighting amount" is, for example, the quantity of light. More specifically, for example, the light source drive circuit 12 is a circuit for controlling the quantity of light of LED during each lighting time by the pulse width modulation (PWM) control. In the display device 100 including the light source drive circuit 12, when a light source of the same color is turned ON during the two lighting periods included in the consecutive subframe periods, the timing controller 13 may output a command to the light source drive circuit 12, to cause the quantity of light of the light source during at least one of the two lighting periods to be less than the quantity of light of light sources of different colors when the light sources of the different colors are respectively turned ON during the two lighting periods included in the consecutive subframe periods. In this case, the light source drive circuit 12 performs the PWM control in accordance with the command.

As described above, in one of the two consecutive display periods (first frame period FL1) in the third embodiment, the six subframe periods: the subframe period SFL1, the subframe period SFL2, the subframe period SFL3, the subframe period SFL4, the subframe period SFL5, and the subframe period SFL6, are provided consecutively in the order of the subframe periods SFL1, SFL2, SFL3, SFL4, SFL5, and SFL6. The subframe period SFL1 includes the writing period SFL11 during which the line image corresponding to the cyan (C) component is written to the first pixel row, and the lighting period SFL12 during which the third light source 11B is turned ON. The subframe period SFL2 includes the writing period SFL21 during which the line image corresponding to the yellow (Y) component is written to the second pixel row, and the lighting period SFL22 during which the second light source 11G is turned ON. The subframe period SFL3 includes the writing period SFL31 during which the line image corresponding to the magenta (M) component is written to the first pixel row, and the lighting period SFL32 during which the first light source 11R is turned ON. The subframe period SFL4 includes the writing period SFL41 during which the line image corresponding to the cyan (C) component is written to the second pixel row, and the lighting period SFL42 during which the third light source 11B is turned ON. The subframe period SFL5 includes the writing period SFL51 during which the line image corresponding to the yellow (Y) component is written to the first pixel row, and the lighting period SFL52 during which the second light source 11G is turned ON. The subframe period SFL6 includes the writing period SFL61 during which the line image corresponding to the red (R) component is written to the second pixel row, and the lighting period SFL62 during which the first light source 11R is turned ON. In the other of the two consecutive display periods (second frame period FL2), the six subframe periods: the subframe period SFLa, the subframe period SFLb, the subframe period SFLc, the subframe period SFLd, the subframe period SFLe, and the subframe period SFLf, are provided consecutively in the order of the subframe periods SFLa, SFLb, SFLc, SFLd, SFLe, and SFLf. The subframe period SFLa includes the writing period SFLa1 during which the line image corresponding to the magenta (M) component is written to the first pixel row, and the lighting period SFLa2 during which the first light source 11R is turned ON. The subframe period SFLb includes the writing period SFLb1 during which the line image corresponding to the cyan (C) component is written to the second pixel row, and the lighting period SFLb2 during which the third light source 11B is turned ON. The subframe period SFLc includes the writing period SFLc1 during which the line image corresponding to the green (G) component is written to the first pixel row, and the lighting period SFLc2 during which the second light source 11G is turned ON. The subframe period SFLd includes the writing period SFLd1 during which the line image corresponding to the yellow (Y) component is written to the second pixel row, and the lighting period SFLd2 during which the second light source 11G is turned ON. The subframe period SFLe includes the writing period SFLe1 during which the line image corresponding to the magenta (M) component is written to the first pixel row, and the lighting period SFLe2 during which the first light source 11R is turned ON. The subframe period SFLf includes the writing period SFLf1 during which the line image corresponding to the blue (B) component is written to the second pixel row, and the lighting period SFLf2 during which the third light source 11B is turned ON. Consequently, it is possible to obtain a color gamut (for example, the color gamut T4 in FIG. 14, which will be described later) larger than that of the first embodiment. It is also possible to adjust the color balance between the first frame period FL1 and the second frame period FL2 better than the second embodiment.

When a light source of the same color is turned ON during the two lighting periods included in the consecutive subframe periods, the lighting amount of the light source during at least one of the two lighting periods may be caused to be less than the lighting amount of light sources of different colors when the light sources of the different colors are respectively turned ON during the two lighting periods included in the consecutive subframe periods. Consequently, it is possible to change the lighting amount in response to the reduction in the lighting cycle of the light sources caused when the periods during which the light source of the same color is turned ON are provided consecutively. Thus, it is possible to reduce flicker of the liquid crystal display panel P.

Fourth Embodiment

Hereinafter, a display device of a fourth embodiment will be described in detail with reference to FIG. 8 and FIG. 9. In the description of the fourth embodiment, the same components as those in the second embodiment are denoted by the same reference numerals, and the description thereof will be omitted.

Figure 8:
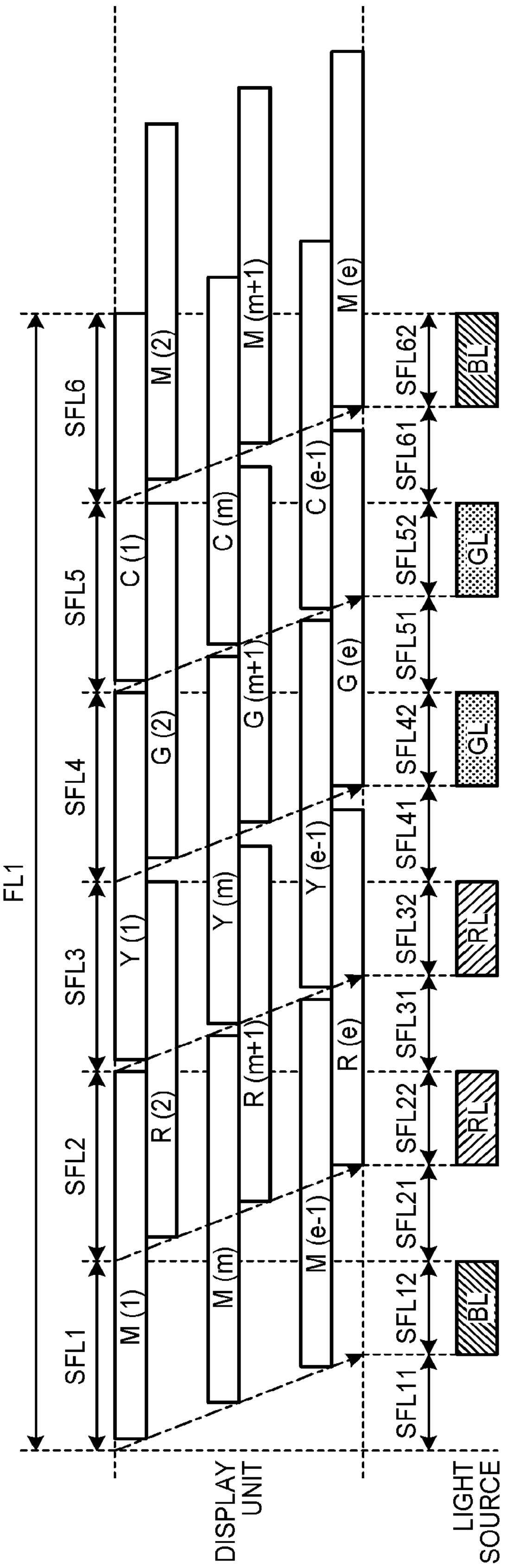
FIG. 8 is a time chart illustrating an example of a field sequential control in a fourth embodiment.
Figure 9:
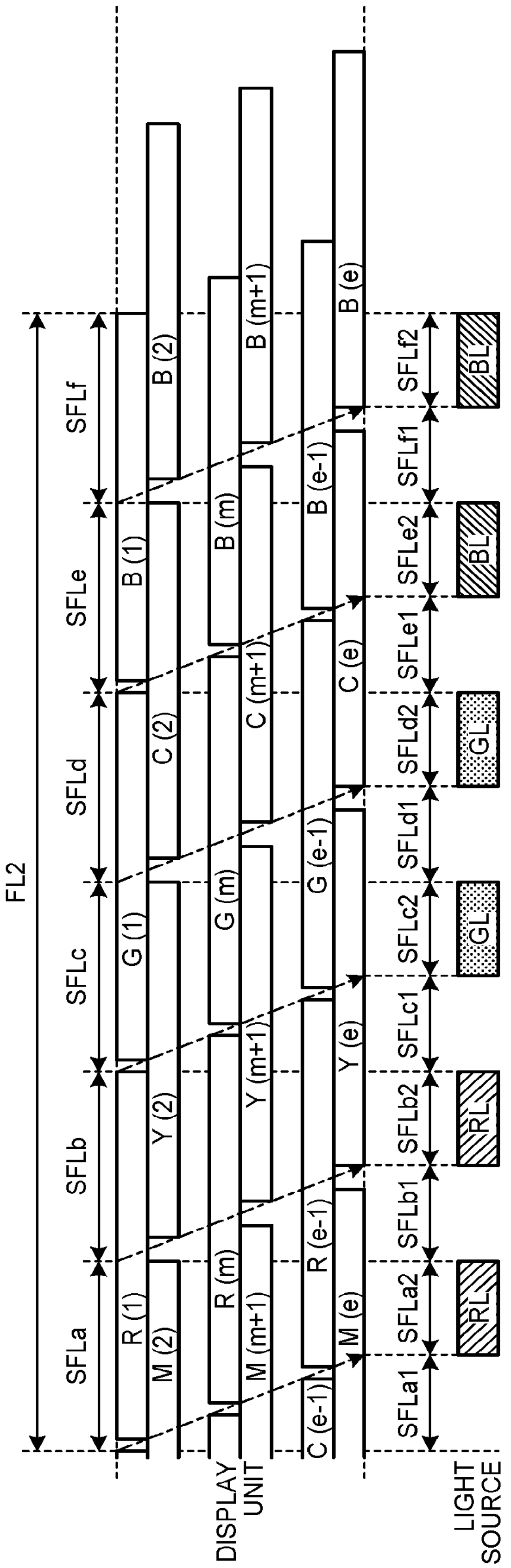
FIG. 9 is a time chart illustrating an example of a field sequential control in the fourth embodiment.

FIG. 8 and FIG. 9 are time charts illustrating an example of a field sequential control in the fourth embodiment. In the fourth embodiment, as illustrated in FIG. 8, during the writing period SFL11, scanning for sequentially writing the line images of the magenta (M) component is performed on the pixels Pix that form the lines of odd rows, in the order of, for example, M(1), . . . , M(m), . . . , and M(e−1). During the writing period SFL21, scanning for sequentially writing the line images of the red (R) component is performed on the pixels Pix that form the lines of even rows, in the order of, for example, R(2), R(m+1), . . . , and R(e). During the writing period SFL31, scanning for sequentially writing the line images of the yellow (Y) component is performed on the pixels Pix that form the lines of odd rows, in the order of, for example, Y(1), . . . , Y(m), . . . , and Y (e−1). During the writing period SFL41, scanning for sequentially writing the line images of the green (G) component is performed on the pixels Pix that form the lines of even rows, in the order of, for example, G(2), . . . , G(m+1), . . . , and G(e). During the writing period SFL51, scanning for sequentially writing the line images of the cyan (C) component is performed on the pixels Pix that form the lines of odd rows, in the order of, for example, C(1), . . . , C(m), . . . , and C(e−1). During the writing period SFL61, scanning for sequentially writing the line images of the magenta (M) component is performed on the pixels Pix that form the lines of even rows, in the order of, for example, M(2), . . . , M(m+1), . . . , and M(e).

The lighting period SFL12 corresponds to the third lighting period BL. The lighting period SFL22 corresponds to the first lighting period RL. The lighting period SFL32 corresponds to the first lighting period RL. The lighting period SFL42 corresponds to the second lighting period GL. The lighting period SFL 52 corresponds to the second lighting period GL. The lighting period SFL62 corresponds to the third lighting period BL.

As illustrated in FIG. 9, during the writing period SFLa1, scanning for sequentially writing the line images of the red (R) component is performed on the pixels Pix that form the lines of odd rows, in the order of, for example, R(1), . . . , R(m), . . . , and R(e−1). In other words, the line images of the cyan (C) component of C(1), . . . , C(m), . . . , and C(e−1) written during the writing period SFL51 are held until the writing period SFLa1. During the writing period SFLb1, scanning for sequentially writing the line images of the yellow (Y) component is performed on the pixels Pix that form the lines of even rows, in the order of, for example, Y(2), . . . , Y(m+1), . . . , and Y(e). In other words, the line images of the magenta (M) component of M(2), . . . , M(m+1), . . . , and M(e) written during the writing period SFL61 are held until the writing period SFLb1. During the writing period SFLc1, scanning for sequentially writing the line images of the green (G) component is performed on the pixels Pix that form the lines of odd rows, in the order of, for example, G(1), . . . , G(m), . . . , and G(e−1). During the writing period SFLd1, scanning for sequentially writing the line images of the cyan (C) component is performed on the pixels Pix that form the lines of even rows, in the order of, for example, C(2), . . . , C(m+1), . . . , and C(e). During the writing period SFLe1, scanning for sequentially writing the line images of the blue (B) component is performed on the pixels Pix that form the lines of odd rows, in the order of, for example, B(1), . . . , B(m), . . . , and B(e−1). During the writing period SFLf1, scanning for sequentially writing the line images of the blue (B) component is performed on the pixels Pix that form the lines of even rows, in the order of, for example, B(2), . . . , B(m+1), . . . , and B(e).

The lighting period SFLa2 corresponds to the first lighting period RL. The lighting period SFLb2 corresponds to the first lighting period RL. The lighting period SFLc2 corresponds to the second lighting period GL. The lighting period SFLd2 corresponds to the second lighting period GL. The lighting period SFLe2 corresponds to the third lighting period BL. The lighting period SFLf2 corresponds to the third lighting period BL.

As described above, in one of the two consecutive display periods (first frame period FL1) in the fourth embodiment, the six subframe periods: the subframe period SFL1, the subframe period SFL2, the subframe period SFL3, the subframe period SFL4, the subframe period SFL5, and the subframe period SFL6, are provided consecutively in the order of the subframe periods SFL1, SFL2, SFL3, SFL4, SFL5, and SFL6. The subframe period SFL1 includes the writing period SFL11 during which the line image corresponding to the magenta (M) component is written to the first pixel row, and the lighting period SFL12 during which the third light source 11B is turned ON. The subframe period SFL2 includes the writing period SFL21 during which the line image corresponding to the red (R) component is written to the second pixel row, and the lighting period SFL22 during which the first light source 11R is turned ON. The subframe period SFL3 includes the writing period SFL31 during which the line image corresponding to the yellow (Y) component is written to the first pixel row, and the lighting period SFL32 during which the first light source 11R is turned ON. The subframe period SFL4 includes the writing period SFL41 during which the line image of the green (G) component is written to the second pixel row, and the lighting period SFL42 during which the second light source 11G is turned ON. The subframe period SFL5 includes the writing period SFL51 during which the line image corresponding to the cyan (C) component is written to the first pixel row, and the lighting period SFL52 during which the second light source 11G is turned ON. The subframe period SFL6 includes the writing period SFL61 during which the line image corresponding to the magenta (M) component is written to the second pixel row, and the lighting period SFL62 during which the third light source 11B is turned ON. In the other of the two consecutive display periods (second frame period FL2), the six subframe periods: the subframe period SFLa, the subframe period SFLb, the subframe period SFLc, the subframe period SFLd, the subframe period SFLe, and the subframe period SFLf, are provided consecutively in the order of the subframe periods SFLa, SFLb, SFLc, SFLd, SFLe, and SFLf. The subframe period SFLa includes the writing period SFLa1 during which the line image corresponding to the red (R) component is written to the first pixel row, and the lighting period SFLa2 during which the first light source 11R is turned ON. The subframe period SFLb includes the writing period SFLb1 during which the line image corresponding to the yellow (Y) component is written to the second pixel row, and the lighting period SFLb2 during which the first light source 11R is turned ON. The subframe period SFLc includes the writing period SFLc1 during which the line image corresponding to the green (G) component is written to the first pixel row, and the lighting period SFLc2 during which the second light source 11G is turned ON. The subframe period SFLd includes the writing period SFLd1 during which the line image corresponding to the cyan (C) component is written to the second pixel row, and the lighting period SFLd2 during which the second light source 11G is turned ON. The subframe period SFLe includes the writing period SFLe1 during which the line image corresponding to the blue (B) component is written to the first pixel row, and the lighting period SFLe2 during which the third light source 11B is turned ON. The subframe period SFLf includes the writing period SFLf1 during which the line image corresponding to the blue (B) component is written to the second pixel row, and the lighting period SFLf2 during which the third light source 11B is turned ON. Consequently, it is possible to obtain a color gamut (for example, the color gamut T4 in FIG. 14, which will be described later) larger than that of the first embodiment. It is also possible to adjust the color balance between the first frame period FL1 and the second frame period FL2 better than the second embodiment.

Fifth Embodiment

Hereinafter, a display device of a fifth embodiment will be described in detail with reference to FIG. 10 and FIG. 11. In the description of the fifth embodiment, the same components as those in the second embodiment are denoted by the same reference numerals, and the description thereof will be omitted.

Figure 10:
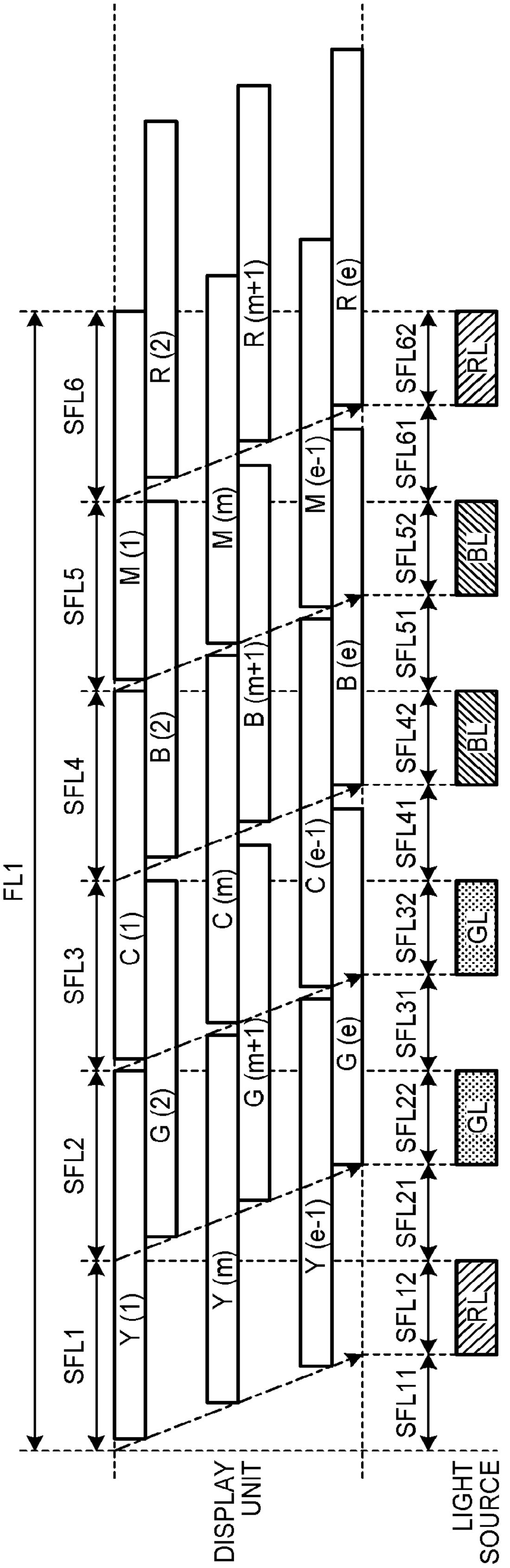
FIG. 10 is a time chart illustrating an example of a field sequential control in a fifth embodiment.
Figure 11:
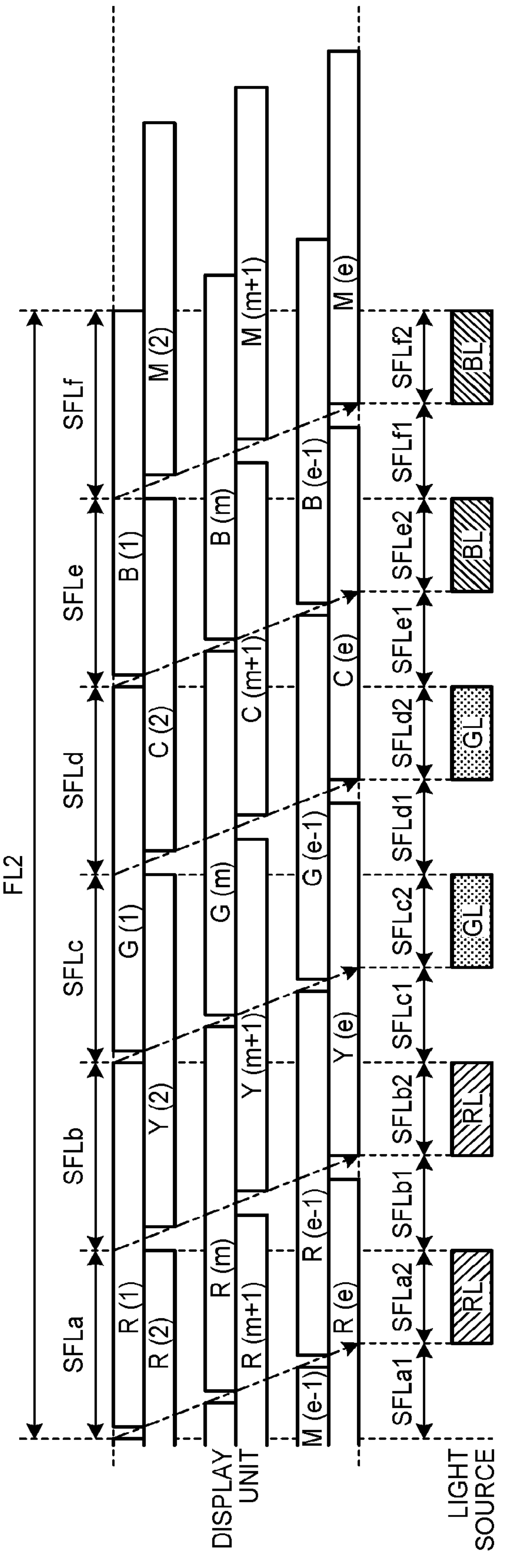
FIG. 11 is a time chart illustrating an example of a field sequential control in the fifth embodiment.

FIG. 10 and FIG. 11 are time charts illustrating an example of a field sequential control in the fifth embodiment. In the fifth embodiment, as illustrated in FIG. 10, during the writing period SFL11, scanning for sequentially writing the line images of the yellow (Y) component is performed on the pixels Pix that form the lines of odd row, in the order of, for example, Y(1), . . . , Y(m), . . . , and Y(e−1). During the writing period SFL21, scanning for sequentially writing the line images of the green (G) component is performed on the pixels Pix that form the lines of even rows, in the order of, for example, G(2), . . . , G(m+1), . . . , and G(e). During the writing period SFL31, scanning for sequentially writing the line images of the cyan (C) component is performed on the pixels Pix that form the lines of odd rows, in the order of, for example, C(1), . . . , C(m), . . . , and C(e−1). During the writing period SFL41, scanning for sequentially writing the line images of the blue (B) component is performed on the pixels Pix that form the lines of even rows, in the order of, for example, B(2), . . . , B(m+1), . . . , and B(e). During the writing period SFL51, scanning for sequentially writing the line images of the magenta (M) component is performed on the pixels Pix that form the lines of odd rows, in the order of, for example, M(1), . . . , M(m), . . . , and M(e−1). During the writing period SFL61, scanning for sequentially writing the line images of the red (R) component is performed on the pixels Pix that form the lines of even rows, in the order of, for example, R(2), . . . , R(m+1), . . . , and R(e).

The lighting period SFL12 corresponds to the first lighting period RL. The lighting period SFL22 corresponds to the second lighting period GL. The lighting period SFL32 corresponds to the second lighting period GL. The lighting period SFL42 corresponds to the third lighting period BL. The lighting period SFL52 corresponds to the third lighting period BL. The lighting period SFL62 corresponds to the first lighting period RL.

As illustrated in FIG. 11, during the writing period SFLa1, scanning for sequentially writing the line images of the red (R) component is performed on the pixels Pix that form the lines of odd rows, in the order of, for example, R(1), . . . , R(m), . . . , and R(e−1). In other words, the line images of the magenta (M) component of M(1), . . . , M(m), . . . , and M(e−1) written during the writing period SFL51 are held until the writing period SFLa1. During the writing period SFLb1, scanning for sequentially writing the line images of the yellow (Y) component is performed on the pixels Pix that form the lines of even rows, in the order of, for example, Y(2), . . . , Y(m+1), . . . , and Y(e). In other words, the line images of the red (R) component of R(2), . . . , R(m+1), . . . , and R(e) written during the writing period SFL61 are held until the writing period SFLb1. During the writing period SFLc1, scanning for sequentially writing the line images of the green (G) component is performed on the pixels Pix that form the lines of odd rows, in the order of, for example, G(1), . . . , G(m), . . . , and G(e−1). During the writing period SFLd1, scanning for sequentially writing the line images of the cyan (C) component is performed on the pixels Pix that form the lines of even rows, in the order of, for example, C(2), . . . , C(m+1), . . . , and C(e). During the writing period SFLe1, scanning for sequentially writing the line images of the blue (B) component is performed on the pixels Pix that form the lines of odd rows, in the order of, for example, B(1), . . . , B(m), . . . , B(e−1). During the writing period SFLf1, scanning for sequentially writing the line images of the magenta (M) component is performed on the pixels Pix that form the lines of even rows, in the order of, for example, M(2), . . . , M(m+1), . . . , and M(e).

The lighting period SFLa2 corresponds to the first lighting period RL. The lighting period SFLb2 corresponds to the first lighting period RL. The lighting period SFLc2 corresponds to the second lighting period GL. The lighting period SFLd2 corresponds to the second lighting period GL. The lighting period SFLe2 corresponds to the third lighting period BL. The lighting period SFLf2 corresponds to the third lighting period BL.

As described above, in one of the two consecutive display periods (first frame period FL1) in the fifth embodiment, the six subframe periods: the subframe period SFL1, the subframe period SFL2, the subframe period SFL3, the subframe period SFL4, the subframe period SFL5, and the subframe period SFL6, are provided consecutively in the order of the subframe periods SFL1, SFL2, SFL3, SFL4, SFL5, and SFL6. The subframe period SFL1 includes the writing period SFL11 during which the line image corresponding to the yellow (Y) component is written to the first pixel row, and the lighting period SFL12 during which the first light source 11R is turned ON. The subframe period SFL2 includes the writing period SFL21 during which the line image corresponding to the green (G) component is written to the second pixel row, and the lighting period SFL22 during which the second light source 11G is turned ON. The subframe period SFL3 includes the writing period SFL31 during which the line image corresponding to the cyan (C) component is written to the first pixel row, and the lighting period SFL32 during which the second light source 11G is turned ON. The subframe period SFL4 includes the writing period SFL41 during which the line image corresponding to the blue (B) component is written to the second pixel row, and the lighting period SFL42 during which the third light source 11B is turned ON. The subframe period SFL5 includes the writing period SFL51 during which the line image corresponding to the magenta (M) component is written to the first pixel row, and the lighting period SFL52 during which the third light source 11B is turned ON. The subframe period SFL6 includes the writing period SFL61 during which the line image corresponding to the red (R) component is written to the second pixel row, and the lighting period SFL62 during which the first light source 11R is turned ON. In the other of the two consecutive display periods (second frame period FL2), the six subframe periods: the subframe period SFLa, the subframe period SFLb, the subframe period SFLc, the subframe period SFLd, the subframe period SFLe, and the subframe period SFLf, are provided consecutively in the order of the subframe periods SFLa, SFLb, SFLc, SFLd, SFLe, and SFLf. The subframe period SFLa includes the writing period SFLa1 during which the line image corresponding to the red (R) component is written to the first pixel row, and the lighting period SFLa2 during which the first light source 11R is turned ON. The subframe period SFLb include the writing period SFLb1 during which the line image corresponding to the yellow (Y) component is written to the second pixel row, and the lighting period SFLb2 during which the first light source 11R is turned ON. The subframe period SFLc includes the writing period SFLc1 during which the line image corresponding to the green (G) component is written to the first pixel row, and the lighting period SFLc2 during which the second light source 11G is turned ON. The subframe period SFLd includes the writing period SFLd1 during which the line image corresponding to the cyan (C) component is written to the second pixel row, and the lighting period SFLd2 during which the second light source 11G is turned ON. The subframe period SFLe includes the writing period SFLe1 during which the line image corresponding to the blue (B) component is written to the first pixel row, and the lighting period SFLe2 during which the third light source 11B is turned ON. The subframe period SFLf includes the writing period SFLf1 during which the line image corresponding to the magenta (M) component is written to the second pixel row, and the lighting period SFLf2 during which the third light source 11B is turned ON. Consequently, it is possible to obtain a color gamut (for example, the color gamut T4 in FIG. 14, which will be described later) larger than that of the first embodiment. It is also possible to adjust the color balance between the first frame period FL1 and the second frame period FL2 better than the second embodiment. As in the case of the third embodiment, in the fifth embodiment also, when a light source of the same color is turned ON during the two lighting periods included in the consecutive subframe periods, the lighting amount of the light source during at least one of the two lighting periods may be caused to be less than the lighting amount of light sources of different colors when the light sources of the different colors are respectively turned ON during the two lighting periods included in the consecutive subframe periods.

Sixth Embodiment

Hereinafter, a display device of a sixth embodiment will be described in detail with reference to FIG. 12 and FIG. 13. In the description of the sixth embodiment, the same components as those in the second embodiment are denoted by the same reference numerals, and the description thereof will be omitted.

Figure 12:
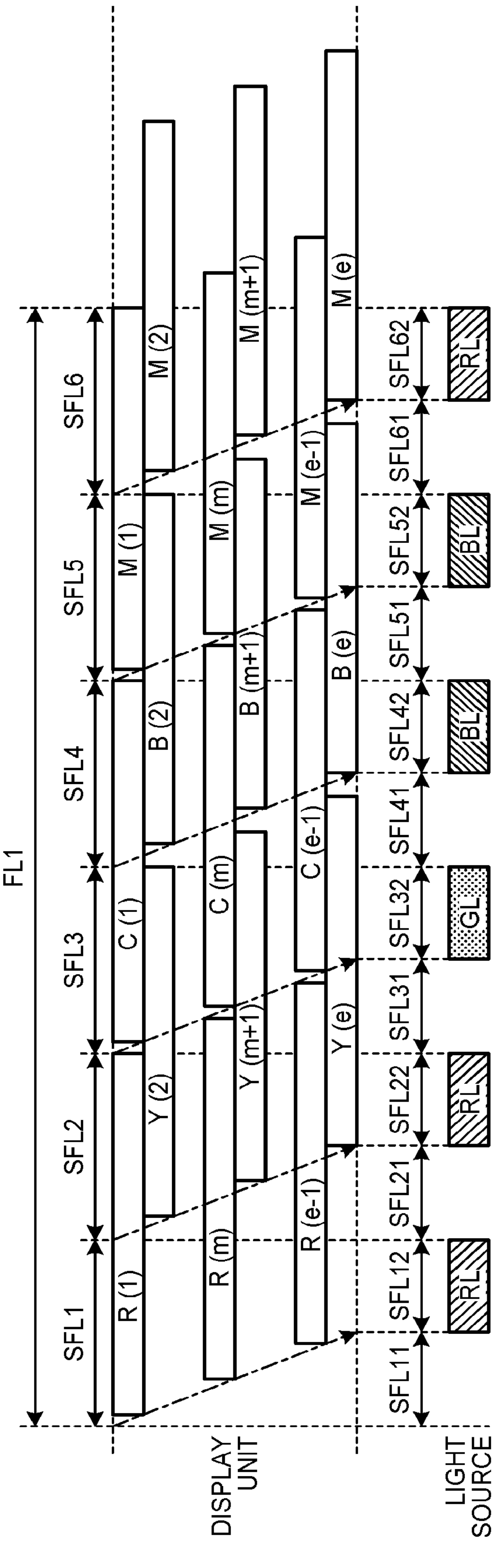
FIG. 12 is a time chart illustrating an example of a field sequential control in a sixth embodiment.
Figure 13:
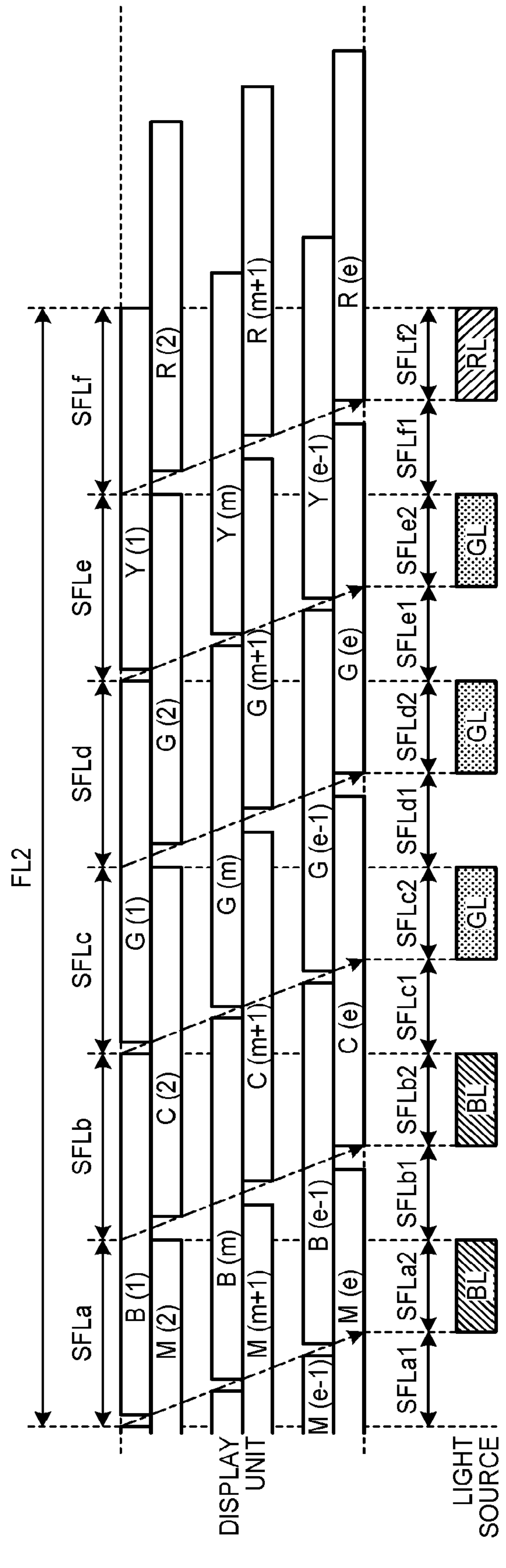
FIG. 13 is a time chart illustrating an example of a field sequential control in the sixth embodiment.

FIG. 12 and FIG. 13 are time charts illustrating an example of a field sequential control in the sixth embodiment. In the sixth embodiment, as illustrated in FIG. 12, during the writing period SFL11, scanning for sequentially writing the line images of the red (R) component is performed on the pixels Pix that form the lines of odd rows, in the order of, for example, R(1), . . . , R(m), . . . , R(e−1). During the writing period SFL21, scanning for sequentially writing the line images of the yellow (Y) component is performed on the pixels Pix that form the lines of even rows, in the order of, for example, Y(2), . . . , Y(m+1), . . . , and Y(e). During the writing period SFL31, scanning for sequentially writing the line images of the cyan (C) component is performed on the pixels Pix that form the lines of odd rows, in the order of, for example, C(1), C(m), . . . , and C(e−1). During the writing period SFL41, scanning for sequentially writing the line images of the blue (B) component is performed on the pixels Pix that form the lines of even rows, in the order of, for example, B(2), B(m+1), . . . , and B(e). During the writing period SFL51, scanning for sequentially writing the line images of the magenta (M) component is performed on the pixels Pix that form the lines of odd rows, in the order of, for example, M(1), . . . , M(m), . . . , and M(e−1). During the writing period SFL61, scanning for sequentially writing the line images of the magenta (M) component is performed on the pixels Pix that form the lines of even rows, in the order of, for example, M(2), . . . , M(m+1), . . . , and M(e).

The lighting period SFL12 corresponds to the first lighting period RL. The lighting period SFL22 corresponds to the first lighting period RL. The lighting period SFL32 corresponds to the second lighting period GL. The lighting period SFL42 corresponds to the third lighting period BL. The lighting period SFL52 corresponds to the third lighting period BL. The lighting period SFL62 corresponds to the first lighting period RL.

As illustrated in FIG. 13, during the writing period SFLa1, scanning for sequentially writing the line images of the blue (B) component is performed on the pixels Pix that form the lines of odd rows, in the order of, for example, B(1), . . . , B(m), . . . , and B(e−1). In other words, the line images of the magenta (M) component of M(1), . . . , M(m), . . . , and M(e−1) written during the writing period SFL51 are held until the writing period SFLa1. During the writing period SFLb1, scanning for sequentially writing the line images of the cyan (C) component is performed on the pixels Pix that form the lines of even rows, in the order of, for example, C(2), . . . , C(m+1), . . . , and C(e). In other words, the line images of the magenta (M) component of M(2), . . . , M(m+1), . . . , and M(e) written during the writing period SFL61 are held until the writing period SFLb1. During the writing period SFLc1, scanning for sequentially writing the line images of the green (G) component is performed on the pixels Pix that form the lines of odd rows, in the order of, for example, G(1), . . . , G(m), . . . , and G(e−1). During the writing period SFLd1, scanning for sequentially writing the line images of the green (G) component is performed on the pixels Pix that form the lines of even rows, in the order of, for example, G(2), . . . , G(m+1), . . . , and G(e). During the writing period SFLe1, scanning for sequentially writing the line images of the yellow (Y) component is performed on the pixels Pix that form the lines of odd rows, in the order of, for example, Y(1), . . . , Y(m), . . . , and Y(e−1). During the writing period SFLf1, scanning for sequentially writing the line images of the red (R) component is performed on the pixels Pix that form the lines of even rows, in the order of, for example, R(2), . . . , R(m+1), . . . , and R(e).

The lighting period SFLa2 corresponds to the third lighting period BL. The lighting period SFLb2 corresponds to the third lighting period BL. The lighting period SFLc2 corresponds to the second lighting period GL. The lighting period SFLd2 corresponds to the second lighting period GL. The lighting period SFLe2 corresponds to the second lighting period GL. The lighting period SFLf2 corresponds to the first lighting period RL.

As described above, in one of the two consecutive display periods (first frame period FL1) in the sixth embodiment, the six subframe periods: the subframe period SFL1, the subframe period SFL2, the subframe period SFL3, the subframe period SFL4, the subframe period SFL5, and the subframe period SFL6, are provided consecutively in the order of the subframe periods SFL1, SFL2, SFL3, SFL4, SFL5, and SFL6. The subframe period SFL1 includes the writing period SFL11 during which the line image corresponding to the red (R) component is written to the first pixel row, and the lighting period SFL12 during which the first light source 11R is turned ON. The subframe period SFL2 includes the writing period SFL21 during which the line image corresponding to the yellow (Y) component is written to the second pixel row, and the lighting period SFL22 during which the first light source 11R is turned ON. The subframe period SFL3 includes the writing period SFL31 during which the line image corresponding to the cyan (C) component is written to the first pixel row, and the lighting period SFL32 during which the second light source 11G is turned ON. The subframe period SFL4 includes the writing period SFL41 during which the line image corresponding to the blue (B) component is written to the second pixel row, and the lighting period SFL42 during which the third light source 11B is turned ON. The subframe period SFL5 includes the writing period SFL51 during which the line image corresponding to the magenta (M) component is written to the first pixel row, and the lighting period SFL52 during which the third light source 11B is turned ON. The subframe period SFL6 includes the writing period SFL61 during which the line image corresponding to the magenta (M) component is written to the second pixel row, and the lighting period SFL62 during which the first light source 11R is turned ON. In the other of the two consecutive display periods (second frame period FL2), the six subframe periods: the subframe period SFLa, the subframe period SFLb, the subframe period SFLc, the subframe period SFLd, the subframe period SFLe, and the subframe period SFLf, are provided consecutively in the order of the subframe periods SFLa, SFLb, SFLc, SFLd, SFLe, and SFLf. The subframe period SFLa includes the writing period SFLa1 during which the line image corresponding to the blue (B) component is written to the first pixel row, and the lighting period SFLa2 during which the third light source 11B is turned ON. The subframe period SFLb includes the writing period SFLb1 during which the line image corresponding to the cyan (C) component is written to the second pixel row, and the lighting period SFLb2 during which the third light source 11B is turned ON. The subframe period SFLc includes the writing period SFLc1 during which the line image corresponding to the green (G) component is written to the first pixel row, and the lighting period SFLc2 during which the second light source 11G is turned ON. The subframe period SFLd includes the writing period SFLd1 during which the line image corresponding to the green (G) component is written to the second pixel row, and the lighting period SFLd2 during which the second light source 11G is turned ON. The subframe period SFLe includes the writing period SFLe1 during which the line image corresponding to the yellow (Y) component is written to the first pixel row, and the lighting period SFLe2 during which the second light source 11G is turned ON. The subframe period SFLf includes the writing period SFLf1 during which the line image corresponding to the red (R) component is written to the second pixel row, and the lighting period SFLf2 during which the first light source 11R is turned ON. Consequently, it is possible to obtain a color gamut (for example, the color gamut T4 in FIG. 14, which will be described later) larger than that of the first embodiment. As in the case of the third embodiment, in the sixth embodiment also, when a light source of the same color is turned ON during the two lighting periods included in the consecutive subframe periods, the lighting amount of the light source during at least one of the two lighting periods may be caused to be less than the lighting amount of light sources of different colors when the light sources of the different colors are respectively turned ON during the two lighting periods included in the consecutive subframe periods.

Figure 14:
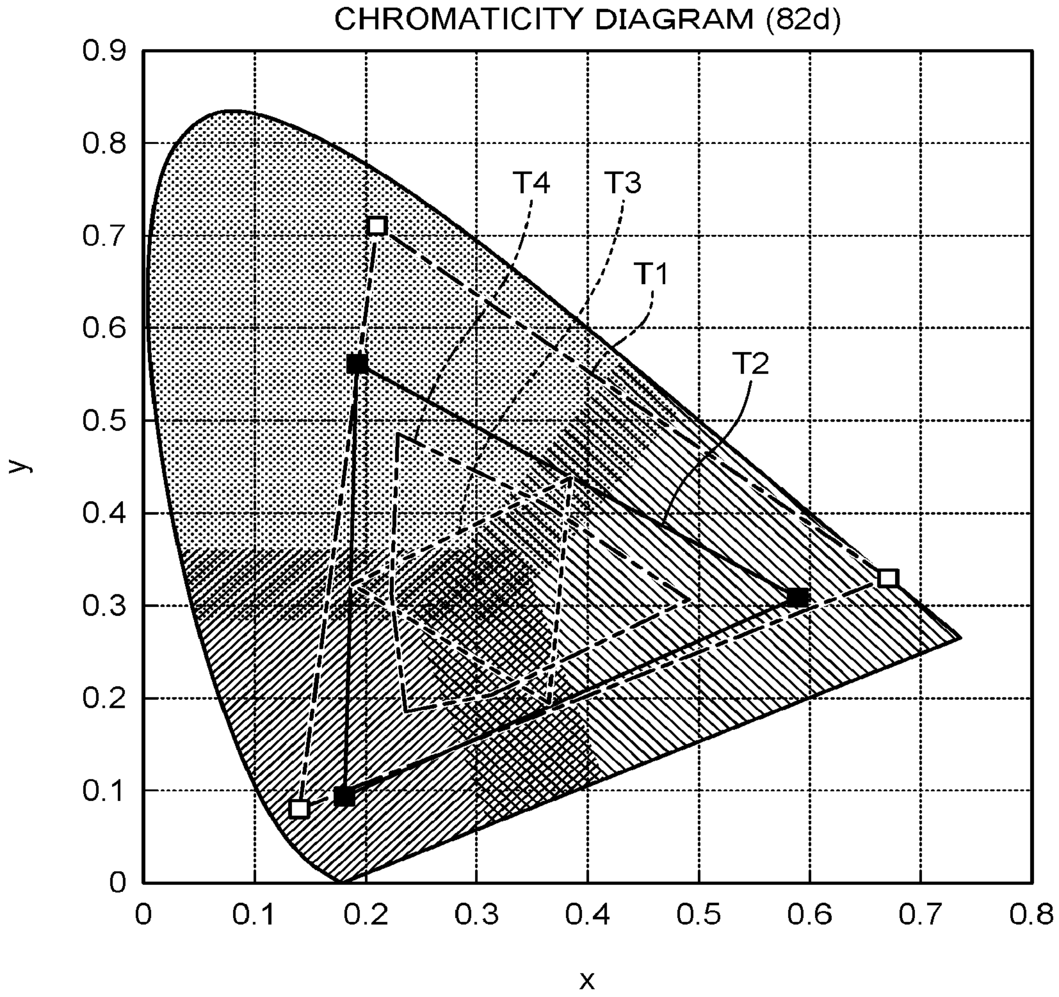
FIG. 14 is a diagram illustrating an example of a color gamut that can be reproduced by a display device in each embodiment.

FIG. 14 is a diagram illustrating an example of a color gamut that can be reproduced by the display device in the embodiments. A color gamut T1 in FIG. 4 schematically illustrates a color gamut defined by the National Television System Committee (NTSC).

For example, it is assumed that a color gamut T2 illustrated in FIG. 14 is the largest color gamut that can be reproduced by a combination of the first light source 11R, the second light source 11G, and the third light source 11B. In this case, the color gamut of the first embodiment that reproduces a frame image by a combination of the lines of the cyan (C) component, magenta (M) component, and yellow (Y) component is expressed by a color gamut T3.

Alternatively, as in the second embodiment to the sixth embodiment, it is possible by adding the lines of red (R), green (G), and blue (B) to the reproduction of the frame image to achieve the color gamut T4 larger than the color gamut T3.

The light source device L may at least illuminate the liquid crystal display panel P, and the specific arrangement of the light source device L can be modified as appropriate. For example, the light source device L may be a front light. The liquid crystal display panel P is not limited to a liquid crystal display panel using the polymer-dispersed liquid crystal. For example, the liquid crystal display panel P may also be a display panel in another type such as a transmissive type, transflective type, or reflective type display panel applied with the FSC, and the like. When the liquid crystal display panel P is a transmissive type display panel, the light source device L is provided at the rear surface side of the display surface.

Other functions and effects brought about by the aspect described in the present embodiment, which are apparent from the description of the present specification, or can be appropriately conceived by those skilled in the art, are naturally understood to be brought about by the present invention.

What is claimed is:

1. A display device comprising:

a display panel including a plurality of pixel rows to which a plurality of line images are written, and configured to display a frame image by arranging the line images in a scanning direction; and a light source configured to emit light to the display panel, wherein the light source includes a first light source configured to emit red light, a second light source configured to emit green light, and a third light source configured to emit blue light, a display period of the frame image includes six subframe periods, each of the subframe periods includes a writing period of a corresponding one of the line images, and a lighting period during which the first light source, the second light source, or the third light source is turned ON, the line image of a color component corresponding to a combination of light emitted during the lighting period of a preceding subframe period of two consecutive subframe periods, and light emitted during the lighting period of a subsequent subframe period of the two consecutive subframe periods, is written during the writing period of the preceding subframe period, and the six subframe periods includes a first subframe period and a second subframe period that are provided alternately and consecutively, the first subframe period includes the writing period during which the line image is written to a first pixel row included in the pixel rows, and the second subframe period includes the writing period during which the line image is written to a second pixel row included in the pixel rows and adjacent to the first pixel row.

2. The display device according to claim 1, wherein one of the first pixel row and the second pixel row is an odd-numbered pixel row arranged in the scanning direction, and the other of the first pixel row and the second pixel row is an even-numbered pixel row arranged in the scanning direction.

3. The display device according to claim 1, wherein the six subframe periods are provided consecutively in the following order:

the subframe period including the writing period during which the line image corresponding to a yellow component is written to the first pixel row, and the lighting period during which the first light source is turned ON;

the subframe period including the writing period during which the line image corresponding to a cyan component is written to the second pixel row, and the lighting period during which the second light source is turned ON;

the subframe period including the writing period during which the line image corresponding to a magenta component is written to the first pixel row, and the lighting period during which the third light source is turned ON;

the subframe period including the writing period during which the line image corresponding to the yellow component is written to the second pixel row, and the lighting period during which the first light source is turned ON;

the subframe period including the writing period during which the line image corresponding to the cyan component is written to the first pixel row, and the lighting period during which the second light source is turned ON; and the subframe period including the writing period during which the line image corresponding to the magenta component is written to the second pixel row, and the lighting period during which the third light source is turned ON.

4. The display device according to claim 1, wherein in one of two consecutive display periods, the six subframe periods are provided consecutively in the following order:

the subframe period including the writing period during which the line image corresponding to a red component is written to the first pixel row, and the lighting period during which the first light source is turned ON;

the subframe period including the writing period during which the line image corresponding to a yellow component is written to the second pixel row, and the lighting period during which the first light source is turned ON;

the subframe period including the writing period during which the line image corresponding to a green component is written to the first pixel row, and the lighting period during which the second light source is turned ON;

the subframe period including the writing period during which the line image corresponding to a cyan component is written to the second pixel row, and the lighting period during which the second light source is turned ON;

the subframe period including the writing period during which the line image corresponding to a magenta component is written to the first pixel row, and the lighting period during which the third light source is turned ON; and the subframe period including the writing period during which the line image corresponding to the red component is written to the second pixel row, and the lighting period during which the first light source is turned ON, and in the other of the two consecutive display periods, the six subframe periods are provided consecutively in the following order:

the subframe period including the writing period during which the line image corresponding to the yellow component is written to the first pixel row, and the lighting period during which the first light source is turned ON;

the subframe period including the writing period during which the line image corresponding to the green component is written to the second pixel row, and the lighting period during which the second light source is turned ON;

the subframe period including the writing period during which the line image corresponding to the cyan component is written to the first pixel row, and the lighting period during which the second light source is turned ON;

the subframe period including the writing period during which the line image corresponding to a blue component is written to the second pixel row, and the lighting period during which the third light source is turned ON;

the subframe period including the writing period during which the line image corresponding to the blue component is written to the first pixel row, and the lighting period during which the third light source is turned ON; and the subframe period including the writing period during which the line image corresponding to the magenta component is written to the second pixel row, and the lighting period during which the third light source is turned on.

5. The display device according to claim 1, wherein in one of two consecutive display periods, the six subframe periods are provided consecutively in the following order:

the subframe period including the writing period during which the line image corresponding to a cyan component is written to the first pixel row, and the lighting period during which the third light source is turned ON;

the subframe period including the writing period during which the line image corresponding to a yellow component is written to the second pixel row, and the lighting period during which the second light source is turned ON;

the subframe period including the writing period during which the line image corresponding to a magenta component is written to the first pixel row, and the lighting period during which the first light source is turned ON;

the subframe period including the writing period during which the line image corresponding to the cyan component is written to the second pixel row, and the lighting period during which the third light source is turned ON;

the subframe period including the writing period during which the line image corresponding to the yellow component is written to the first pixel row, and the lighting period during which the second light source is turned ON; and the subframe period including the writing period during which the line image corresponding to a red component is written to the second pixel row, and the lighting period during which the first light source is turned ON, and in the other of the two consecutive display periods, the six subframe periods are provided consecutively in the following order:

the subframe period including the writing period during which the line image corresponding to the magenta component is written to the first pixel row, and the lighting period during which the first light source is turned ON;

the subframe period including the writing period during which the line image corresponding to the cyan component is written to the second pixel row, and the lighting period during which the third light source is turned ON;

the subframe period including the writing period during which the line image corresponding to a green component is written to the first pixel row, and the lighting period during which the second light source is turned ON;

the subframe period including the writing period during which the line image corresponding to the yellow component is written to the second pixel row, and the lighting period during which the second light source is turned ON;

the subframe period including the writing period during which the line image corresponding to the magenta component is written to the first pixel row, and the lighting period during which the first light source is turned ON; and the subframe period including the writing period during which the line image corresponding to a blue component is written to the second pixel row, and the lighting period during which the third light source is turned ON.

6. The display device according to claim 5, wherein when the light source emits light in the same color during two lighting periods included in consecutive subframe periods, a lighting amount of the light source during at least one of the two lighting periods is less than a lighting amount of the light source when the light source emits light in different colors, respectively, during the two lighting periods included in the consecutive subframe periods.

7. The display device according to claim 1, wherein in one of two consecutive display periods, the six subframe periods are provided consecutively in the following order:

the subframe period including the writing period during which the line image corresponding to a magenta component is written to the first pixel row, and the lighting period during which the third light source is turned ON;

the subframe period including the writing period during which the line image corresponding to a red component is written to the second pixel row, and the lighting period during which the first light source is turned ON;

the subframe period including the writing period during which the line image corresponding to a yellow component is written to the first pixel row, and the lighting period during which the first light source is turned ON;

the subframe period including the writing period during which the line image corresponding to a green component is written to the second pixel row, and the lighting period during which the second light source is turned ON;

the subframe period including the writing period during which the line image corresponding to a cyan component is written to the first pixel row, and the lighting period during which the second light source is turned ON; and the subframe period including the writing period during which the line image corresponding to the magenta component is written to the second pixel row, and the lighting period during which the third light source is turned ON, and in the other of the two consecutive display periods, the six subframe periods are provided consecutively in the following order:

the subframe period including the writing period during which the line image corresponding to a red component is written to the first pixel row, and the lighting period during which the first light source is turned ON;

the subframe period including the writing period during which the line image corresponding to the yellow component is written to the second pixel row, and the lighting period during which the first light source is turned ON;

the subframe period including the writing period during which the line image corresponding to the green component is written to the first pixel row, and the lighting period during which the second light source is turned ON;

the subframe period including the writing period during which the line image corresponding to the cyan component is written to the second pixel row, and the lighting period during which the second light source is turned ON;

the subframe period including the writing period during which the line image corresponding to a blue component is written to the first pixel row, and the lighting period during which the third light source is turned ON; and the subframe period including the writing period during which the line image corresponding to the blue component is written to the second pixel row, and the lighting period during which the third light source is turned ON.

8. The display device according to claim 1, wherein in one of two consecutive display periods, the six subframe periods are provided consecutively in the following order:

the subframe period including the writing period during which the line image corresponding to a yellow component is written to the first pixel row, and the lighting period during which the first light source is turned ON;

the subframe period including the writing period during which the line image corresponding to a green component is written to the second pixel row, and the lighting period during which the second light source is turned ON;

the subframe period including the writing period during which the line image corresponding to a cyan component is written to the first pixel row, and the lighting period during which the second light source is turned ON;

the subframe period including the writing period during which the line image corresponding to a blue component is written to the second pixel row, and the lighting period during which the third light source is turned ON;

the subframe period including the writing period during which the line image corresponding to a magenta component is written to the first pixel row, and the lighting period during which the third light source is turned ON; and the subframe period including the writing period during which the line image corresponding to a red component is written to the second pixel row, and the lighting period during which the first light source is turned ON, and in the other of the two consecutive display periods, the six subframe periods are provided consecutively in the following order:

the subframe period including the writing period during which the line image corresponding to the red component is written to the first pixel row, and the lighting period during which the first light source is turned ON;

the subframe period including the writing period during which the line image corresponding to the yellow component is written to the second pixel row, and the lighting period during which the first light source is turned ON;

the subframe period including the writing period during which the line image corresponding to the green component is written to the first pixel row, and the lighting period during which the second light source is turned ON;

the subframe period including the writing period during which the line image corresponding to the cyan component is written to the second pixel row, and the lighting period during which the second light source is turned ON;

the subframe period including the writing period during which the line image corresponding to the blue component is written to the first pixel row, and the lighting period during which the third light source is turned ON; and the subframe period including the writing period during which the line image corresponding to the magenta component is written to the second pixel row, and the lighting period during which the third light source is turned ON.

9. The display device according to claim 1, wherein in one of two consecutive display periods, the six subframe periods are provided consecutively in the following order:

the subframe period including the writing period during which the line image corresponding to a red component is written to the first pixel row, and the lighting period during which the first light source is turned ON;

the subframe period including the writing period during which the line image corresponding to a yellow component is written to the second pixel row, and the lighting period during which the first light source is turned ON;

the subframe period including the writing period during which the line image corresponding to a cyan component is written to the first pixel row, and the lighting period during which the second light source is turned ON;

the subframe period including the writing period during which the line image corresponding to a blue component is written to the second pixel row, and the lighting period during which the third light source is turned ON;

the subframe period including the writing period during which the line image corresponding to a magenta component is written to the first pixel row, and the lighting period during which the third light source is turned ON; and the subframe period including the writing period during which the line image corresponding to the magenta component is written to the second pixel row, and the lighting period during which the first light source is turned ON, and in the other of the two consecutive display periods, the six subframe periods are provided consecutively in the following order:

the subframe period including the writing period during which the line image corresponding to the blue component is written to the first pixel row, and the lighting period during which the third light source is turned ON;

the subframe period including the writing period during which the line image corresponding to the cyan component is written to the second pixel row, and the lighting period during which the third light source is turned ON;

the subframe period including the writing period during which the line image corresponding to a green component is written to the first pixel row, and the lighting period during which the second light source is turned ON;

the subframe period including the writing period during which the line image corresponding to the green component is written to the second pixel row, and the lighting period during which the second light source is turned ON;

the subframe period including the writing period during which the line image corresponding to the yellow component is written to the first pixel row, and the lighting period during which the second light source is turned ON; and the subframe period including the writing period during which the line image corresponding to the red component is written to the second pixel row, and the lighting period during which the first light source is turned ON.

10. The display device according to claim 1, wherein the display panel is a display panel in which a polymer-dispersed liquid crystal is sealed between two facing substrates.

11. A display device comprising:

a display panel including a plurality of pixel rows to which a plurality of line images are written, and configured to display a frame image by arranging the line images in a scanning direction; and a light source configured to emit light to the display panel, wherein the light source includes a first light source configured to emit first light, a second light source configured to emit second light, and a third light source configured to emit third light, one frame period of the frame image includes six subframe periods, each of the six subframe periods includes a writing period of a corresponding one of the line images, and a lighting period subsequent to the writing period, during the lighting period, at least one of the first light source, the second light source, and the third light source is turned ON, the line image written during the writing period of a preceding subframe period of two consecutive subframe periods is held until the lighting period of a subsequent subframe period, the line images written during the preceding subframe period and the subsequent subframe period are written to different pixel rows, and the line images written during the preceding subframe period and the subsequent subframe period are written to adjacent pixel rows.

* * * * *